(12) United States Patent
Jones

(10) Patent No.: US 11,649,421 B2
(45) Date of Patent: *May 16, 2023

(54) APPARATUS AND METHOD FOR PRESERVING THE AROMA OF A FERMENTABLE BEVERAGE

(71) Applicant: Aromaloc Inc., Penticton (CA)

(72) Inventor: Richard L Jones, Naramata (CA)

(73) Assignee: AROMALOC INC., Penticton (CA)

(*) Notice: Subject to any disclaimer, the term of this patent is extended or adjusted under 35 U.S.C. 154(b) by 7 days.

This patent is subject to a terminal disclaimer.

(21) Appl. No.: 17/370,760

(22) Filed: Jul. 8, 2021

(65) Prior Publication Data

US 2021/0340473 A1   Nov. 4, 2021

Related U.S. Application Data

(63) Continuation of application No. 14/801,947, filed on Jul. 17, 2015, now Pat. No. 11,168,292, which is a
(Continued)

(51) Int. Cl.
*C12G 1/022* (2006.01)
*B01D 19/00* (2006.01)
(Continued)

(52) U.S. Cl.
CPC ....... *C12G 1/0203* (2013.01); *B01D 19/0005* (2013.01); *C12C 11/00* (2013.01);
(Continued)

(58) Field of Classification Search
CPC ............................ B01D 19/0005; C12C 11/00
See application file for complete search history.

(56) References Cited

U.S. PATENT DOCUMENTS 1,493,183 A * 5/1924 Backhaus ............... C01B 32/50
  95/141
1,510,373 A * 9/1924 Backhaus ............... C01B 32/50
  95/141
(Continued)

FOREIGN PATENT DOCUMENTS

CA      2672085 C    5/2010
DE  102007047175 C5  4/2009
(Continued)

OTHER PUBLICATIONS

Office Action issued on EP14785783.3 dated Jun. 6, 2018.
(Continued)

*Primary Examiner* — Stephanie A Cox
(74) *Attorney, Agent, or Firm* — Bereskin & Parr LLP

(57) ABSTRACT

A fermentation apparatus for preserving the aroma of a fermentable beverage is provided. The fermentation apparatus comprises a flow passage fluidly connectable to the headspace located above a fermentable beverage in a fermentation container. A carbon dioxide scrubber in the flow passage receives a headspace fluid mixture comprising at least carbon dioxide gas and an aromatic fluid originating from the fermenting beverage. When the headspace fluid mixture contacts the carbon dioxide scrubber, the carbon dioxide scrubber retains a modified fluid in the flow passage. The modified fluid has a lower carbon dioxide gas concentration and a higher aromatic fluid concentration than the headspace fluid mixture. The flow passage directs the modified fluid back to the headspace to at least partially retain the aromatic fluid in the fermentable beverage in the fermentation container. A method for preserving the aroma of a fermentable beverage is also provided.

15 Claims, 17 Drawing Sheets

Related U.S. Application Data continuation-in-part of application No. PCT/CA2014/000359, filed on Apr. 17, 2014.

(60) Provisional application No. 61/813,529, filed on Apr. 18, 2013.

(51) Int. Cl.
| | |
|---|---|
| C12H 3/04 | (2019.01) |
| C12C 13/00 | (2006.01) |
| C12C 11/00 | (2006.01) |
| C12G 1/02 | (2006.01) |
| C12G 3/02 | (2019.01) |
| C12F 3/06 | (2006.01) |
| C12F 3/04 | (2006.01) |

(52) U.S. Cl.
CPC ............... *C12C 13/00* (2013.01); *C12F 3/04* (2013.01); *C12F 3/06* (2013.01); *C12G 1/02* (2013.01); *C12G 3/02* (2013.01); *C12H 3/04* (2019.02)

(56) References Cited

U.S. PATENT DOCUMENTS

| | | | | |
|---|---|---|---|---|
| 1,706,707 | A * | 3/1929 | Reilly | C01B 3/52 |
| | | | | 435/168 |
| 2,536,994 | A | 1/1951 | Cremaschi | |
| 3,526,509 | A | 9/1970 | Kamada et al. | |
| 3,852,477 | A | 12/1974 | Venter et al. | |
| 4,112,829 | A * | 9/1978 | Poinsard | C12F 3/02 |
| | | | | 165/111 |
| 4,336,335 | A | 6/1982 | Muller et al. | |
| 4,699,642 | A * | 10/1987 | Perry | C12C 5/02 |
| | | | | 62/541 |
| 4,867,997 | A | 9/1989 | Wiesenberger et al. | |
| 6,755,975 | B2 | 6/2004 | Vane et al. | |
| 6,962,629 | B2 * | 11/2005 | Johnson | F25J 3/08 |
| | | | | 134/10 |
| 8,956,671 | B1 * | 2/2015 | Norkin | C12F 3/02 |
| | | | | 426/15 |
| 2002/0020667 | A1 | 2/2002 | Brown | |
| 2008/0078290 | A1 | 4/2008 | Hagg et al. | |
| 2010/0047422 | A1 | 2/2010 | Magalhaes Mendes et al. | |
| 2012/0067209 | A1 | 3/2012 | Sandru et al. | |
| 2013/0009092 | A1 * | 1/2013 | Ziegler | B01D 53/72 |
| | | | | 252/182.12 |
| 2016/0244704 | A1 | 8/2016 | Norkin et al. | |

FOREIGN PATENT DOCUMENTS

| | | |
|---|---|---|
| EP | 2995366 A1 | 3/2016 |
| RU | 2313571 C1 | 12/2007 |
| RU | 2378358 C1 | 1/2010 |
| WO | 200228994 A1 | 4/2002 |
| WO | 2005121306 A1 | 12/2005 |
| WO | 2007099550 A2 | 9/2007 |
| WO | 2008099325 A2 | 8/2008 |
| WO | 2013017581 A1 | 2/2013 |
| WO | 2014169378 A1 | 10/2014 |
| WO | 2018214770 A1 | 11/2018 |

OTHER PUBLICATIONS

Diban et al. Ethanol and aroma compounds transfer study for partial dealcoholization of wine using membrane contactor, J. Membrane Science vol. 311 (2008) 136-146.
Vane, L.M. Pervaporation and Vapor Permeation Tutorial: Membrane Processes for the Selective Separation of Liquid and Vapor Mixtures, Separation Science and Technology. vol. 48 (2013) 429-437.
Ribeiro et al. A combined gas-stripping vapour permeation process for aroma recovery, Membrane science. vol. 238 (1-20 (2004)9-19.
Manjuan She, Sun-Tak Hwang. Concentration of dilute flavor compounds by pervaporation: permeate pressure effect and boundary layer resistance modeling, J Membrane Science. vol. 236 (1-2) (2004) 193-202.
Vallieres et al. Vacuum versus sweeping gas operation for binary mixtures separation by dense membrane processes, J Membrane Science. vol. 244 (2004) 17-23.
Rebollar-Perez et al. Volatile Organic Compound (VOC) Removal by Vapor Permeation at Low VOC Concentrations: Laboratory Scale Results and Modeling for Scale Up. Membranes. vol. 1 (1)(2011) 80-90.
Ebner et al. State-of-the-art Adsorption and Membrane Separation Processes for Carbon Dioxide Production from Carbon Dioxide Emitting Industries, Separation Science and Technology, 44: 1273-1421, 2009 [Retrieved on Mar. 7, 2019] Retrieved from http://www.researchgate.net/publication/244611591 (Year: 2009).
Tsachaki et al. Aroma release form wines under dynamic conditions, J. Agric. Food Chem., Jul. 14, 2009, 57 (15), pp. 6976-6981.
Morakul et al., Comprehensive Study of the Evolution of Gas-Liquid Partitioning of Aroma Compounds during Wine Alcoholic Fermentation, J. Agric. Food Chem., 2010, 58 (18), pp. 10219-10225.
Lacureanu et al, Compounds Trapped in the CO2 Flow of Busuioaca De Bohotin Alchoolic Fermentation, Lucrari Stiintifice, 2 012, vol. 55, No. 2, pp. 435-437.
Morakul et al., A Dynamic Analysis of Higher Alcohol and Ester Release During Winemaking Fermentations, Food and Bioprocess Technology, Mar. 2013, vol. 6, Issue 3, pp. 818-827.
Shen et al., Effects of CO2 on the formation of flavor volatiles during fermentation with immobilised brewer's yeast, Appl. Microbiol. Biotechnol., 2004, vol. 64, pp. 636-643.
Tsachaki et al., Effect of Ethanol, Temperature, and Gas Flow Rate on Volatile Release from Aqueous Solutions under Dynamic Headspace Dilution Conditions, J. Agric. Food Chem., 2008, vol. 56, pp. 5308-5315.
Mouret et al., Gas-liquid transfer of aroma compounds during winemaking fermentations, LWT-Food Science and Technology, Dec. 2012, vol. 49, No. 2, pp. 238-244.
Carbon Dioxide from Fermentations, Greenlime, http://www.greenlime.com.au/Recycleing-CO2-from Wine.php Feb. 22, 2013.
Ferreira et al., Losses of volatile compounds during fermentation, Z Lebensm Unters Forsch, 1996, vol. 202, pp. 318-323.
MEMFO 20 years' Celebration Seminar, May 2014, Trondheim, Norway.
Morakul et al., Modelling of the gas-liquid partitioning of aroma compounds during wine alcoholic fermentation and prediction of aroma losses, Process Biochemistry, May 2011, vol. 46, Issue 5, pp. 1125-1131.
Mew membrane catches CO2, Gemini, 2008, http://www.ntnu.no/gemini/2008-english/6.htm.
Program & Abstract, Crush 2012, the grape and wine science symposium, Nov. 2012, Adelaide, South Australia.
AromaLoc Ltd., http://www.aromaloc.com, Dec. 15, 2016.
Boswell, C.D., J. Varley, L. Boon, C.J. Hewitt, A.W. Nienow (2003). Comparison of methods of effecting enhanced liquid circulation. Trans IChemE, vol. 81, Part C: 33-39.
Molina, A.M., J.H. Swiegers, C. Varela, I.S. Pretorius, E. Agosin (2007). Influence of wine fermentation temperature on the synthesis of yeast-derived volatile aroma compounds Appl Microbiol Biotechnol 77:675-687.
L. Guerrini, P. Masella, P. Spungnoli, S. Spinelli, L. Calamai (2016). A Condenser to Recover Organic Volatile Compounds during Vinification Am J Enol Vitic. 67: 163-168.
Diban, N., V. Athes, M. Bes, I. Souchon (2008). Ethanol and aroma compounds transfer study for partial dealcoholization of wine using membrane contactor. J Mem Sci. 311:136-146.
Diban, N., A. Arruti, A. Barcelo, M. Puxeu, A. Urtiaga, I. Ortiz (2013). Membrane dealcoholization of different wine varieties reducing aroma losses. Modeling and experimental validation. Innovative Food Science and Emerging Technologies 20: 259-268.

(56) References Cited

OTHER PUBLICATIONS

Hodson, E. MSc Thesis (2004) Virginia Tech University. Effects of Capture and Return on Chardonnay (*Vitis vinifera* L.) Fermentation Volatiles.
European Search Report on EP14785783.3 dated Nov. 3, 2016.
International Preliminary Report on Patentability on PCT/CA2014/000359 dated Oct. 20, 2015.
Office Action issued on corresponding EP20752750.8 dated Sep. 16, 2022.
Favvas et al., A review of the latest development of polyimide based membranes for CO2 separations, Elsevier, Reactive and Functional Polymers 120 (2017) 104-130.

\* cited by examiner

APPARATUS AND METHOD FOR PRESERVING THE AROMA OF A FERMENTABLE BEVERAGE

CROSS-REFERENCES TO RELATED APPLICATIONS

This application is a continuation of U.S. application Ser. No. 14/801,947, filed Jul. 17, 2015, which is a continuation-in-part of PCT Application Serial No. PCT/CA2014/000359, filed Apr. 17, 2014. PCT Application Serial No. PCT/CA2014/000359 claims priority to U.S. Provisional Application Ser. No. 61/813,529, filed Apr. 18, 2013. The entire contents of U.S. application Ser. No. 14/801,947, PCT Application Serial No. PCT/CA2014/000359 and U.S. Provisional Application Ser. No. 61/813,529 are hereby incorporated by reference.

FIELD

The described embodiments relate to a fermentation apparatus and method for preserving the aroma of a fermentable beverage.

INTRODUCTION

There are numerous fermented beverages, including, for example, wine, beer, spirits, ciders, and champagnes. As an example, wine fermentation typically begins with pressed grape juice or crushed grapes including both the juice and grape skins. The juice and skins contain aroma compounds that are unique to the type of grape and the locale where the grapes were grown. When the juice is inoculated with yeast to initiate fermentation, the yeast cells consume the sugar in the grape juice and in the process produce ethyl alcohol and carbon dioxide plus a wide variety of yeast-derived aroma compounds and waste by-products. The aroma compounds can desirably affect the smell and/or taste of the wine and the enjoyment associated with drinking the fermented wine.

As part of the typical fermentation process, carbon dioxide gas is vented to the atmosphere during fermentation to avoid increasing pressure in the fermentation container. Some exceptions to this involve the production of carbonated beverages where a small supplemental fermentation is conducted inside an already bottled beverage. In typical fermentation, the carbon dioxide gas takes with it some of the desirable aroma compounds. In turn, the consumable fermented beverage is deprived of at least some desirable aroma compounds that would have otherwise enhanced the taste and/or smell of the fermented beverage. In some cases, desirable aroma compounds escape with carbon dioxide by diffusing into carbon dioxide bubbles. In some cases, desirable aroma compounds diffuse directly into the headspace from the surface of a fermenting beverage.

The enjoyment associated with drinking fermented beverages, such as wine or beer, for example, may be affected by aroma compounds present in the beverage. Some of these aroma compounds are representative of the base products, such as the variety of grape used in wine making, for example. Important aromas are also derived from yeast metabolism during fermentation of the beverage. Some of these aroma compounds have a low gas/liquid partition coefficient which makes them less volatile and helps keep them contained in the beverage during fermentation where they remain, for the most part, in the finished beverage. Other aroma compounds have higher gas/liquid partition coefficients. These aroma compounds are relatively more volatile and will diffuse into the headspace above the fermenting beverage, which exposes them to loss during fermentation when carbon dioxide gas, produced during fermentation, is released from the system and takes with it some of the volatile aroma compounds. This decreases the concentration of the aroma compounds in the finished, consumable beverage. This loss of aroma in the escaping carbon dioxide gas is sometimes referred to as "carbon dioxide stripping".

Aroma compounds with higher gas/liquid partition coefficients are important since, in order to detect aroma, the aroma compounds are typically volatile. Notably, more volatile aroma compounds are relatively more susceptible to carbon dioxide stripping. Esters, for example, are a group of aroma compounds important in giving wine its fruity flavor, but tend to have higher gas/liquid partition coefficients and are relatively susceptible to carbon dioxide stripping. Desirable aroma compounds may include, but are not limited to, ethyl hexanoate, ethyl butyrate, ethyl octanoate, isoamylacetate and hexylacetate.

The movement of volatile aroma compounds from the beverage to the headspace above the beverage depends on the concentration difference between the two compartments. The higher the concentration difference, the greater the movement of aroma from the fermenting beverage to the headspace, and the greater the "carbon dioxide stripping".

Fermenting beverages can be complicated due to the constantly changing levels of sugar and ethanol during the fermentation process, along with the presence of proteins, all of which affect the transfer of aroma to the headspace, and subsequent loss of aroma through carbon dioxide stripping. Depletion of sugar and the production of ethanol both decrease the gas/liquid partition coefficient thus helping to preserve what is left of the aromatic esters in the fermenting beverage by limiting carbon dioxide stripping.

The loss of aroma from carbon dioxide stripping may also be temperature dependent. Higher temperatures during fermentation can deplete certain esters due to their lower production at high temperature and also their accelerated loss due to a higher gas/liquid partition coefficient and higher rates of carbon dioxide production by the more active yeast metabolism. Therefore, production of fruity wines is best done at lower fermentation temperatures, but this lengthens the wine making process. Low fermentation temperatures can also lead to unreliable and stuck fermentations when using certain yeasts. Many of the most desirable aroma compounds have a high gas/liquid partition coefficient and, in some cases, more than 70% of these aroma compounds can be lost by carbon dioxide stripping when fermentation is conducted at a relatively warm temperature.

Winemakers, for example, have attempted to preserve the fruity aroma and flavor of white wine by fermenting grape juice at cool temperatures. This decreases the gas/liquid partition coefficient, thus helping to keep the aroma compounds dissolved in the wine while at the same time a cooler temperature slows yeast metabolism which decreases the rate of carbon dioxide production. The end result is decreased loss of aroma by carbon dioxide stripping and more aroma retention in the wine. However, aroma loss typically still does occur and producing the wine takes longer.

For red wine production, for example, color extraction from the red grape skins is important as is extraction of tannins and other compounds from the skins. Red wine is generally fermented at warmer temperatures to achieve these goals, but the resultant higher temperatures enhance the loss of varietal and yeast-derived aromas due to the temperature-dependent increase in gas/liquid partition coefficients and increased rate of carbon dioxide production due to more vigorous yeast metabolism. So, regardless of the type of wine produced, there is often carbon dioxide stripping of desirable aroma compounds.

The issue of aroma loss during fermentation is an important one and a variety of methods have been advanced for preserving some of the aroma in wine or beer. However, these methods often require tampering with the beverage or capturing and isolating aroma compounds during fermentation for reintroduction to the beverage after fermentation. Some of these existing methods require the use of complex refrigeration or vacuum equipment for treating or isolating the aroma compounds. It would be desirable to have an apparatus and method for selectively reducing, removing, absorbing, or the like (collectively "scrubbing") carbon dioxide while preserving aroma compounds during fermentation of a beverage; preferably, without tampering directly with the fermenting beverage, or capturing aroma compounds and then returning them later directly into the fermented liquid beverage. It would also be desirable to have an apparatus and method whereby aroma compounds are not isolated and captured but rather are allowed to recirculate back to the headspace from which they originated.

There exists a need for an improved apparatus and method for preserving the aroma of a fermentable beverage.

SUMMARY

The following is intended to introduce the reader to the more detailed discussion to follow. The summary is not intended to limit or define the claims.

According to one broad aspect of this disclosure, a fermentation apparatus is provided for preserving the aroma of a fermentable beverage. The fermentation apparatus comprises a closure engageable with a fermentation container containing a fermentable beverage. The fermentation container has at least one port. The fermentation apparatus comprises a flow passage coupled to the closure. The flow passage is fluidly connectable to the at least one port of the fermentation container when the closure engages the fermentation container to fluidly connect a headspace located above the fermentable beverage in the fermentation container with the flow passage. The fermentation apparatus comprises a carbon dioxide scrubber in the flow passage. The carbon dioxide scrubber receives from the at least one port a headspace fluid mixture made up of at least carbon dioxide gas and an aromatic fluid originating from the fermenting beverage. When the headspace fluid mixture contacts the carbon dioxide scrubber, the carbon dioxide scrubber permits at least a portion of the carbon dioxide gas to exit the flow passage and retains at least a portion of the aromatic fluid in the flow passage to thereby retain a modified fluid in the flow passage. The modified fluid has a lower carbon dioxide gas concentration and a higher aromatic fluid concentration than the headspace fluid mixture. The flow passage directs the modified fluid to the at least one port in the fermentation container to direct the modified fluid through the reentry port of the fermentation container to reenter the headspace to at least partially retain the aromatic fluid in the fermentable beverage in the fermentation container.

In some embodiments, the at least one port comprises an exit port and a reentry port. In these embodiments, the flow passage is fluidly connectable to the exit port of the fermentation container when the closure engages the fermentation container to fluidly connect the headspace located above the fermentable beverage in the fermentation container with the flow passage. In these embodiments, the carbon dioxide scrubber receives from the exit port the headspace fluid mixture comprising at least carbon dioxide gas and the aromatic fluid originating from the fermenting beverage. In these embodiments, the flow passage directs the modified fluid mixture to the reentry port of the fermentation container to direct the modified fluid mixture through the reentry port of the fermentation container to reenter the headspace to at least partially retain the aromatic fluid in the fermentable beverage in the fermentation container.

In some embodiments, the carbon dioxide scrubber comprises a carbon dioxide selective membrane. The carbon dioxide selective membrane may permit the carbon dioxide gas to pass therethough and out of the flow passage and to retain the aromatic fluid in the flow passage In some embodiments, the fermentation apparatus comprises a sweep gas directed across an exterior surface of the carbon dioxide selective membrane located external to the flow passage to lower the carbon dioxide partial pressure on an exterior side of the carbon dioxide selective membrane relative to a flow passage side of the carbon dioxide selective membrane, to facilitate the passage of the carbon dioxide gas through the carbon dioxide selective membrane and out of the flow passage.

In some embodiments, the fermentation apparatus comprises a negative pressure generator located external to the flow passage to direct the sweep gas across the exterior surface of the carbon dioxide selective membrane and permit decreased pressure on the exterior surface of the membrane.

In some embodiments, the carbon dioxide selective membrane includes at least one of: a planar gas selective membrane, a plurality of stacked planar membranes, a tubular hollow membrane and a bundle of tubular hollow membranes.

In some embodiments, the carbon dioxide selective membrane is a fixed-site carrier membrane.

In some embodiments, the carbon dioxide scrubber comprises a carbon dioxide absorber containing a carbon dioxide absorbing material. In these embodiments, the carbon dioxide absorbing material absorbs and removes the carbon dioxide gas from the flow passage.

In some embodiments, the flow passage comprises a release valve in fluid communication with the headspace. In these embodiments, the release valve is openable to vent a portion of at least one of the headspace fluid mixture and the modified fluid to the external atmosphere In some embodiments, the fermentation apparatus comprises a fluid pump in fluid communication with the headspace and the carbon dioxide scrubber to transport the headspace fluid mixture and the modified fluid through the flow passage.

In some embodiments, the fermentation apparatus comprises an expansion chamber having a flexible wall and containing an expansion gas therein, the expansion chamber being in fluid communication with the flow passage. An interior volume defined by the flexible wall may be adjustable to accommodate pressure fluctuations in the flow passage.

According to another broad aspect of this disclosure, a method is provided for preserving the aroma of a fermentable beverage. The method comprises fermenting the beverage in a fermentation container to produce a headspace fluid mixture comprising at least carbon dioxide gas and an aromatic fluid in a headspace located above the beverage contained in the fermentation container. The method comprises permitting the headspace fluid mixture to exit the container into a flow passage. The method comprises permitting the headspace fluid mixture to flow through the flow passage and into contact with a carbon dioxide scrubber to separate the carbon dioxide gas in the headspace fluid mixture from the aromatic fluid in the headspace mixture by permitting at least a portion of the carbon dioxide gas to exit the flow passage and retaining at least a portion of the aromatic fluid in the flow passage to thereby retain a modified fluid in the flow passage. The modified fluid has a lower carbon dioxide concentration and a higher aromatic fluid concentration than the headspace fluid mixture. The method further comprises permitting the modified fluid remaining in the flow passage after contacting the carbon dioxide scrubber to reenter the headspace to at least partially retain the aromatic fluid in the fermentable beverage in the fermentation container.

In some embodiments, a fluid pump is in fluid communication with the headspace and the carbon dioxide scrubber to transport the headspace fluid mixture and the modified fluid through the flow passage.

In some embodiments, the carbon dioxide scrubber removes from the flow passage substantially all of the carbon dioxide gas that contacts the carbon dioxide scrubber. In some embodiments, the carbon dioxide scrubber retains in the flow passage substantially all of the aromatic fluid that contacts the carbon dioxide scrubber.

In some embodiments, the carbon dioxide scrubber is capable of removing the carbon dioxide gas from the flow passage at a removal rate at least as high as the maximum production rate at which the carbon dioxide gas is produced in the headspace by the fermentation of the beverage.

In some embodiments, permitting the headspace fluid mixture to flow through the flow passage into contact with the carbon dioxide scrubber occurs during the entire duration of the fermentation.

In some embodiments, permitting the headspace fluid mixture to flow through the flow passage into contact with the carbon dioxide scrubber occurs during less than the entire duration of the fermentation.

In some embodiments, the headspace fluid mixture comprises aromatic fluid and waste by-products produced by the fermentation of the beverage. In these embodiments, the headspace fluid mixture may flow into contact with the carbon dioxide scrubber during a first portion of the fermentation. The headspace fluid mixture may be permitted to escape from the flow passage to the external atmosphere via an airlock during a second portion of the fermentation, thereby allowing the aromatic fluid, the waste by-products and the carbon dioxide gas produced during the second portion of the fermentation to escape to the external atmosphere. The second portion of the fermentation occurs after the first portion of the fermentation.

In some embodiments, the modified fluid includes a portion of the carbon dioxide gas and the portion of the aromatic fluid in the headspace mixture retained in the flow passage after contacting the carbon dioxide scrubber. A portion of the modified fluid may be permitted to exit the flow passage via a release valve in the flow passage, and the modified fluid remaining in the flow passage may be permitted to reenter the headspace.

In some embodiments, the carbon dioxide scrubber comprises a carbon dioxide selective membrane. In these embodiments, when the headspace fluid mixture contacts the carbon dioxide selective membrane, the carbon dioxide selective membrane permits the carbon dioxide gas in the headspace fluid mixture to pass therethrough and out of the flow passage and retains the aromatic fluid in the headspace fluid mixture in the flow passage.

In some embodiments, the carbon dioxide selective membrane is a diffusive membrane that permits the carbon dioxide gas to diffuse therethrough and out of the flow passage.

In some embodiments, a sweep gas is directed across an exterior surface of the carbon dioxide selective membrane located external to the flow passage to facilitate the passage of the carbon dioxide gas through the carbon dioxide selective membrane and out of the flow passage.

In some embodiments, the sweep gas includes one of: air, inert gas, and a combination of inert gas and air.

In some embodiments, the carbon dioxide scrubber comprises a carbon dioxide absorber containing a carbon dioxide absorbing material. In these embodiments, when the headspace fluid mixture contacts the carbon dioxide absorbing material, the carbon dioxide absorbing material absorbs the carbon dioxide gas from the headspace fluid mixture.

In some embodiments, the carbon dioxide gas that exits the flow passage via the carbon dioxide scrubber is released to the external atmosphere.

In some embodiments, the carbon dioxide gas that exits the flow passage via the carbon dioxide scrubber is transferred to a carbon dioxide storage vessel fluidly connected to the carbon dioxide scrubber.

According to one broad aspect of this disclosure, a fermentation apparatus is provided for preserving the aroma of a fermentable beverage. The fermentation apparatus comprises a closure engageable with a fermentation container containing a fermentable beverage. The fermentation container has an exit port and a reentry port. The fermentation apparatus comprises a flow passage coupled to the closure. The flow passage is fluidly connectable to the exit port and the reentry port of the fermentation container when the closure engages the fermentation container to fluidly connect a headspace located above the fermentable beverage in the fermentation container with the flow passage. The fermentation apparatus comprises a carbon dioxide scrubber in the flow passage. The carbon dioxide scrubber receives from the exit port a headspace fluid mixture made up of at least carbon dioxide gas and an aromatic fluid originating from the fermenting beverage. When the headspace fluid mixture contacts the carbon dioxide scrubber, more of the carbon dioxide gas than the aromatic fluid in the headspace fluid mixture exits the flow passage via the carbon dioxide scrubber, to retain a modified fluid mixture in the flow passage. The flow passage directs the modified fluid mixture to the reentry port of the fermentation container to direct the modified fluid mixture through the reentry port of the fermentation container to reenter the headspace to at least partially retain the aromatic fluid in the fermentable beverage in the fermentation container.

According to another broad aspect of this disclosure, a method is provided for preserving the aroma of a fermentable beverage. The method comprises fermenting the beverage in a fermentation container to produce a headspace fluid mixture comprising at least carbon dioxide gas and an aromatic fluid in a headspace located above the beverage contained in the fermentation container. The method comprises permitting the headspace fluid mixture to exit the container into a flow passage. The method comprises permitting the headspace fluid mixture to flow through the flow passage and into contact with a carbon dioxide scrubber to separate the carbon dioxide gas in the headspace fluid mixture from the aromatic fluid in the headspace mixture by permitting more of the carbon dioxide gas than the aromatic fluid to exit the flow passage via the carbon dioxide scrubber to retain a modified fluid mixture in the flow passage. The method comprises permitting the modified fluid mixture remaining in the flow passage after contacting the carbon dioxide scrubber to reenter the headspace to at least partially retain the aromatic fluid in the fermentable beverage in the fermentation container.

DRAWINGS

Reference is made in the description of various embodiments to the accompanying drawings, in which.

DESCRIPTION OF VARIOUS EMBODIMENTS

Although the apparatus and methods may relate to the fermentation of wine, the apparatuses and methods described herein may be used during the fermentation of other beverages. In some cases, it is desirable to selectively remove, reduce, absorb, or the like (collectively "scrub") one or more fluids while preserving one or more other fluids, such as, when fermenting beer, fermenting the base liquid used for spirit distillation, fermenting ciders, initially fermenting champagnes and other fermented beverages.

Figure 1:
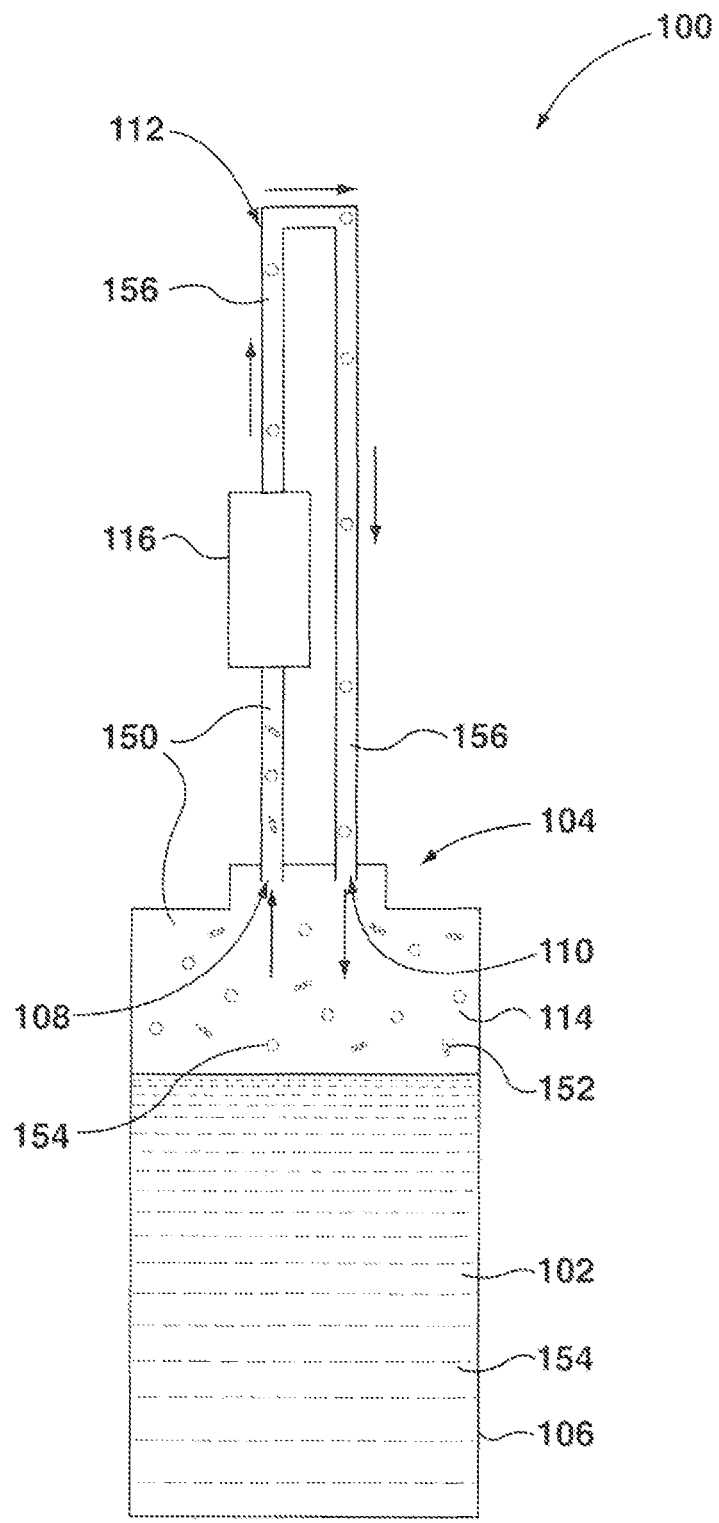
FIG. 1 is cut-away side view of a fermentation apparatus in accordance with an embodiment of the invention.

Reference is made to FIG. 1, which shows an exemplary first embodiment of fermentation apparatus 100 for preserving the aroma of fermentable beverage 102. The fermentation apparatus 100 includes closure 104 engageable with fermentation container 106 holding fermentable beverage 102. Fermentation container 106 has at least one port. As exemplified in FIG. 1, the at least one port comprises exit port 108 and reentry port 110. Flow passage 112 is coupled to closure 104. Flow passage 112 fluidly connects to the at least one port (exemplified in FIG. 1 as exit port 108 and reentry port 110) of fermentation container 106 when closure 104 engages fermentation container 106. When closure 104 engages fermentation container 106, headspace 114 located above fermentable beverage 102 in fermentation container 106 is fluidly connected with flow passage 112. In some cases, exit port 108 and reentry port 110 are located in closure 104 above headspace 114 when closure 104 is engaged with fermentation container 106.

In some embodiments, closure 104 is a lid that fluidly seals container 106. The lid may be snap-fit, friction-fit, fit with a pneumatic seal or threaded onto container 106, for example. In some embodiments, closure 104 is removably engageable with container 106. Alternatively, closure 104 may be engageable with fermentation container 106 by being integrally formed therewith. In some cases, closure 104 may be fixedly connected to container 106.

As illustrated in FIG. 1, flow passage 112 has carbon dioxide scrubber 116. Carbon dioxide scrubber 116 receives from the at least one fluid port (exemplified in FIG. 1 as exit port 108) headspace fluid mixture 150 comprising, at least, carbon dioxide gas 152 and aromatic fluid 154 originating from fermentable beverage 102. Aromatic fluid 154 comprises desirable aroma compounds that enhance the taste and/or smell of fermentable beverage 102 when it is consumed after fermentation. Exemplary aromatic fluids 154 (which enhance beverage taste and/or smell) include, but are not limited to, ethyl hexanoate, ethyl buryrate, ethyl octanoate, isoamylacetate and hexylacetate.

When headspace fluid mixture 150 contacts carbon dioxide scrubber 116, carbon dioxide scrubber 116 permits at least a portion of carbon dioxide gas 152 to exit flow passage 112 and retains at least a portion of aromatic fluid 154 in flow passage 112 to thereby retain modified fluid 156 in flow passage 112. At least a portion of carbon dioxide gas 152 is "scrubbed from" flow passage 112, via carbon dioxide scrubber 116, to retain modified fluid 156 in flow passage 112. Modified fluid 156 has a lower carbon dioxide gas 152 concentration and a higher aromatic fluid 154 concentration than headspace fluid mixture 150.

Carbon dioxide gas 152 concentration is typically expressed in units of volume of carbon dioxide gas to volume of total fluid mixture. The concentration of carbon dioxide gas 152 in headspace fluid mixture 150 may be expressed as volume of carbon dioxide gas 152 per volume of headspace fluid mixture 150 (e.g. parts per million or percentage volume). The concentration of carbon dioxide gas 150 in modified fluid 156 may be expressed as volume of carbon dioxide gas 152 per volume of modified fluid 156 (e.g. parts per million or percentage volume).

Aromatic fluid 154 may be in liquid, gas or vapour form, or some combination thereof. In some cases, aromatic fluid 154 is in the form of liquid droplets. In some cases, aromatic fluid 154 is in the form of vaporized droplets. If present, these vaporized droplets may be in isolation or entrained in gaseous aromatic fluid. In some cases, aromatic fluid 154 contains the same aromatic compounds. In other cases, aromatic fluid 154 contains more than one type of aromatic compound. The concentration of aromatic fluid 154 in headspace fluid mixture 150 may be expressed as mass of aromatic fluid 154 per unit volume of headspace fluid mixture 150 (e.g. milligrams per litre). The concentration of aromatic fluid 154 in modified fluid 156 may be expressed as mass of aromatic fluid 154 per volume of modified fluid 156 (e.g. milligrams per litre).

Flow passage 112 directs modified fluid 156 to the at least one port (exemplified as reentry port 110 in FIG. 1) of fermentation container 106 to direct modified fluid 156 through the at least one port of fermentation container 106 (reentry port 110, FIG. 1). In this manner, modified fluid 156 reenters headspace 114 of the fermentation container 106 to at least partially retain aromatic fluid 154 in fermentable beverage 102.

Typically, when fermentable beverage 102 starts to ferment, the concentration of aromatic fluid 154 in the fermentable beverage 102 (which may be expressed in mass of aromatic fluid 154 per volume of fermentable beverage 102) is relatively low. When fermentable beverage 102 starts to ferment, the concentration of this aromatic fluid 154 in headspace 114 (which may be expressed in mass of aromatic fluid 154 per volume of headspace fluid mixture 150) is also relatively low. As fermentation progresses, aromatic fluid 154 production increases rapidly in fermentable beverage 102 and aromatic fluid 154 migrates into headspace 114 (along with carbon dioxide gas 152). At this stage, the concentration of aromatic fluid 154 in beverage 102 is higher than in headspace 114, so aromatic fluid 154 moves from beverage 102 to headspace 114. When modified fluid 156 reenters headspace 114 (after headspace fluid mixture 150 contacts carbon dioxide scrubber 116), it has a relatively high proportion of aromatic fluid 154 (as compared to headspace fluid mixture 150). Due to the relatively higher concentration of aromatic fluid 154 in the headspace at this point (by way of aromatic fluid 154 reintroduced into the headspace), aromatic fluid 154 in fermentable beverage 102 is more inhibited from leaving the fermentable beverage 102 than if carbon dioxide scrubber 116 were not utilized. By maintaining the relative concentration of aromatic fluid 154 in headspace 114, less aromatic fluid 154 in fermentable beverage 102 is required to leave fermentable beverage 102 as the system strives to equilibrate the concentration of aromatic fluid 154 between beverage 102 and headspace 114. In this manner, the carbon dioxide scrubber 116 at least partially retains aromatic fluid 154 in fermentable beverage 102.

As shown in FIG. 1, flow passage 112 may be a conduit, such as plastic piping, for example. In alternative embodiments, the flow passage may be an opening in closure 104. In these alternative embodiments, carbon dioxide scrubber 116 may extend across the flow passage (i.e. extending across an aperture in closure 104), to separate headspace 114 from the external atmosphere when closure 104 is engaged with fermentation container 106.

Continuing to refer to FIG. 1, another embodiment of this disclosure provides a method for preserving the aroma of fermentable beverage 102. The method comprises fermenting beverage 102 in fermentation container 106 to produce headspace fluid mixture 150 comprising at least carbon dioxide gas 152 and aromatic fluid 154 in headspace 114 located above fermentable beverage 102 contained in fermentation container 106. The method further comprises permitting the headspace fluid mixture 150 to exit container 106 into flow passage 112. Headspace fluid mixture 150 flows through flow passage 112 and into contact with carbon dioxide scrubber 116 to separate carbon dioxide gas 152 in headspace fluid mixture 150 from aromatic fluid 154 in headspace fluid mixture 150 by permitting at least a portion of carbon dioxide gas 152 to exit flow passage 112 and retaining at least a portion of aromatic fluid 154 in flow passage 112 to thereby retain a modified fluid 156 in flow passage 112. Carbon dioxide scrubber 116 retains a modified fluid 156 in the flow passage 112 by "scrubbing" carbon dioxide gas 152 from flow passage 112. Modified fluid 156 has a lower carbon dioxide gas 152 concentration and a higher aromatic fluid 154 concentration than headspace fluid mixture 150. The method comprises permitting modified fluid 156 to remain in flow passage 112 after contacting carbon dioxide scrubber 116 to reenter headspace 114 to at least partially retain aromatic fluid 154 in fermentable beverage 102 in fermentation container 106.

Returning aromatic fluid 154 to the headspace 114 above the fermentable beverage 102 in the fermentation container 106 helps to maintain the concentration of aromatic fluid 154 in the headspace 114 above the fermenting beverage 102. This helps to decrease the movement of aromatic fluids that enhance the smell and/or taste of fermentable beverage 102 from the beverage 102 into headspace 114 during fermentation.

Since carbon dioxide gas 152 is generated to some extent throughout the fermentation process, scrubbing the carbon dioxide gas 152 from the headspace fluid mixture 150 via the carbon dioxide scrubber 116 may allow further carbon dioxide gas 152 to be generated by fermenting beverage 102 without excess buildup of carbon dioxide gas 152 in the fermentation apparatus. Excess buildup of carbon dioxide gas 152 in the fermentation apparatus is undesirable as it could increase the pressure in the fermentation apparatus. In extreme cases, this increase in pressure could lead to explosive failure of the fermentation apparatus.

In some cases, carbon dioxide scrubber 116 removes from the flow passage 112 substantially all of the carbon dioxide gas 152 that contacts the carbon dioxide scrubber 116. In some cases, carbon dioxide scrubber 116 retains in flow passage 112 substantially all of aromatic fluid 154 that contacts carbon dioxide scrubber 116.

It will be appreciated that although FIG. 1 and other figures that will be discussed below do not explicitly indicate carbon dioxide gas 152 reentering headspace 114, this may occur in some embodiments. For example, in some cases, carbon dioxide scrubber 116 may not remove all of carbon dioxide gas 152 in headspace fluid mixture 150 from flow passage 112.

Figure 2:
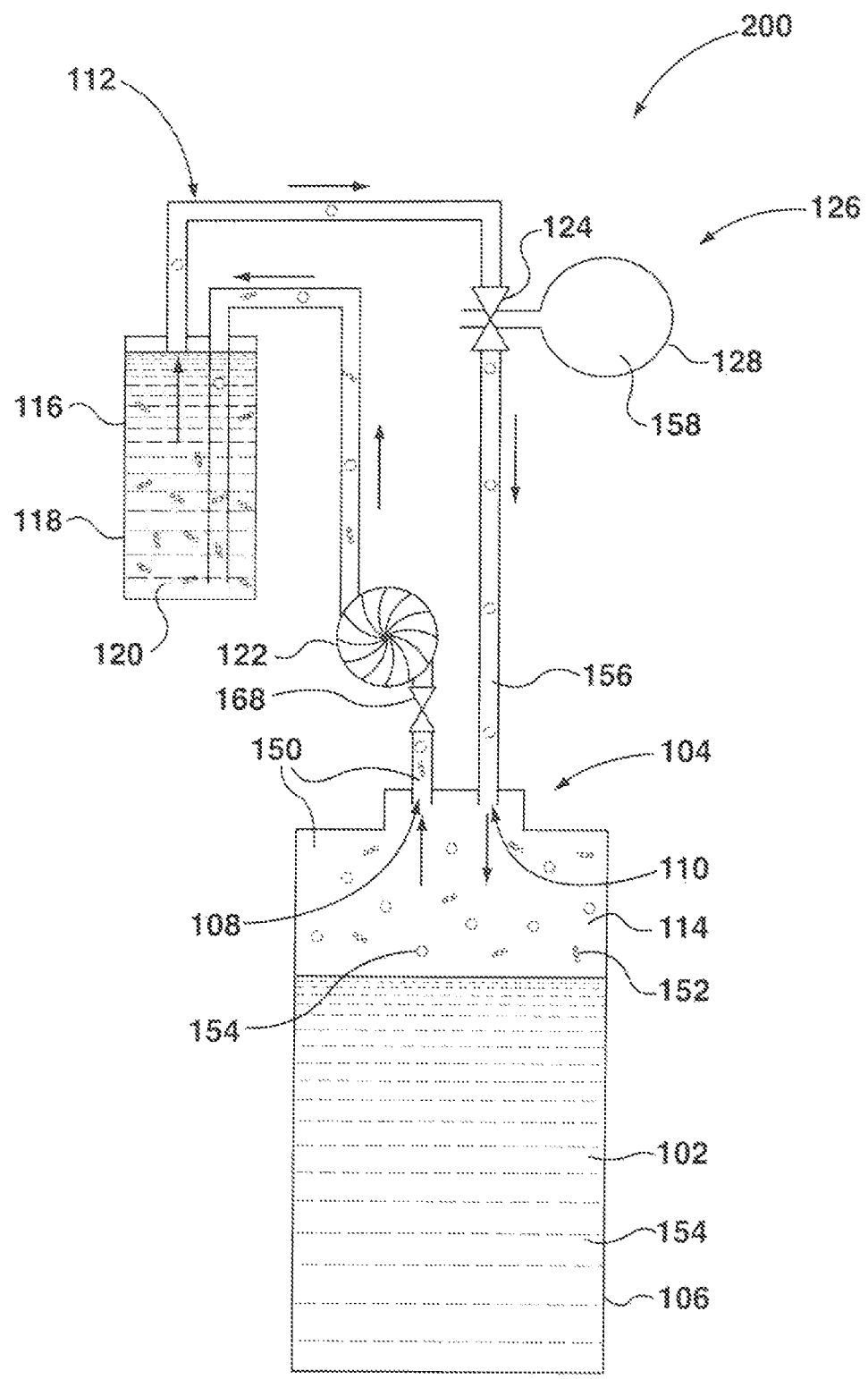
FIG. 2 is a cut-away side view of a fermentation apparatus in accordance with another embodiment comprising a carbon dioxide absorber.

FIG. 2 exemplifies a second embodiment of a fermentation apparatus 200. It will be appreciated that for simplicity and clarity of illustration, elements of fermentation apparatus 200 corresponding or analogous to elements of fermentation apparatus 100 are labeled with the same reference numerals as for fermentation apparatus 100. For brevity, the description of similar or corresponding elements is not repeated.

As exemplified in FIG. 2, carbon dioxide scrubber 116 may be, or may include, carbon dioxide absorber 118 containing carbon dioxide absorbing material 120. Carbon dioxide absorbing material 120 absorbs and retains more of carbon dioxide gas 152 than aromatic fluid 154. In this manner, more of carbon dioxide gas 152 than aromatic fluid 154 may be removed (i.e. scrubbed) from headspace fluid mixture 150 in flow passage 112. Carbon dioxide absorbing material 120 may be soda lime, for example. In other embodiments, carbon dioxide absorbing material 120 may be, for example, other agents commonly used for chemical carbon dioxide absorption, such as monoethanolamine (MEA), methyldiethanolamine (MDEA) or other amine solvents known by those skilled in the art. The potential for contamination of the beverage by recirculating the headspace gas through these chemical carbon dioxide absorbers is a consideration. This is also a consideration for physical carbon dioxide absorption using solvents such as Selexol® or Rectisol®, for example. In some embodiments, such chemical and physical carbon dioxide absorbers may be recycled in order to enhance their usefulness as carbon dioxide absorbents.

In some embodiments, carbon dioxide capture molecules may be used as physical adsorbents in conjunction with molecular sieves and metal organic frameworks. Preferably, such carbon dioxide capture molecules are used on relatively larger scale fermentation processes and in relatively low humidity environments.

Continuing to refer to FIG. 2, in some embodiments, when headspace fluid mixture 150 contacts carbon dioxide absorbing material 120, carbon dioxide absorbing material 120 absorbs carbon dioxide gas 152 from headspace fluid mixture 150 and removes carbon dioxide gas 152 from flow passage 112. In some embodiments, the fermentation apparatus further includes fluid pump 122, as exemplified in FIG. 2. Fluid pump 122 may be, for example, an electric gas pump, a gas blower, or a fan. More specifically, fluid pump 122 may be a centrifugal blower, a regenerative blower, a positive displacement blower, a diaphragm pump or an axial fan, for example. In some cases, the fermentation apparatus may include a plurality of fluid pumps. In some cases, fluid pump 122 is in fluid communication with headspace 114 and carbon dioxide scrubber 116. In some embodiments, fluid pump 122 transports headspace fluid mixture 150 and modified fluid 156 through flow passage 112. Fluid pump 122 may increase pressure in flow passage 112. Alternatively, different fluid pumps may be used to transport headspace fluid mixture 150 and modified fluid 156, respectively, through flow passage 112. While the fluid pump 122 is shown upstream of carbon dioxide scrubber 116 in FIG. 2, it will be appreciated that fluid pump 122 may be located in different positions in the fermentation apparatus, such as, for example, downstream of carbon dioxide scrubber 116. In some embodiments, the methods described herein include transporting headspace fluid mixture 150 and modified fluid 156 through flow passage 112 using fluid pump 122.

Continuing to refer to FIG. 2, in some embodiments, flow passage 112 includes a release valve 124 in fluid communication with headspace 114. Release valve 124 may be openable to vent a portion of at least one of headspace fluid mixture 150 and modified fluid 156 to the external atmosphere. Release valve 124 may be located downstream of the carbon dioxide scrubber 116 and upstream of the reentry port 110 of fermentation container 106. Release valve 124 may vent a portion of modified fluid 156 to the external atmosphere when the pressure in the fermentation apparatus exceeds a predetermined value. Release valve 124 may be included in the flow passage 112 when the amount or rate of carbon dioxide gas 152 produced by fermenting beverage 102 exceeds the maximum amount or rate of carbon dioxide gas 152 that can be removed from flow passage 112 by carbon dioxide scrubber 116. This release of carbon dioxide gas 152 (containing some aromatic fluid 154) may be used to reduce the pressure within the fermentation apparatus to acceptable levels. While the release valve 124 is shown in FIG. 2 downstream of carbon dioxide scrubber 116 and upstream of the reentry port 110, it will be appreciated that release valve 124 may be located in other positions within the fermentation apparatus. For example, release valve 124 may be located in fermentation container 106 or closure 104. It will be understood that a portion of aromatic fluid 154 may be lost if the release valve 124 vents the modified fluid 156. However, the quality of the fermentable beverage 102 can still be improved by opening release valve 124 for only a portion of the fermentation of beverage 102 and retaining a portion of aromatic fluid 154 in flow passage 112.

Continuing to refer to FIG. 2, in some embodiments, a portion of carbon dioxide gas 152 and at least a portion of aromatic fluid 154 in headspace fluid mixture 150 may be retained in flow passage 112 and included in modified fluid 156 after headspace fluid mixture 150 contacts carbon dioxide scrubber 116. In these embodiments, a portion of modified fluid 156 may be allowed to exit flow passage 112 via release valve 124, while the modified fluid 156 remaining in flow passage 112 may be permitted to reenter headspace 114. In this manner, a portion of carbon dioxide gas 152 retained in flow passage 112 (in modified fluid 156) may be allowed to vent to the external atmosphere to avoid a detrimental build-up of carbon dioxide gas pressure in the fermentation apparatus. Another portion of modified fluid 156 remaining in flow passage 112 may be permitted to reenter headspace 114 to increase the concentration of aromatic fluid 154 in headspace 114.

As exemplified in FIG. 2, in some embodiments, the fermentation apparatus includes an expansion chamber 126 having flexible wall 128 and containing expansion gas 158 therein. Expansion gas 158 may be an inert gas, such as argon, nitrogen or helium, for example. Expansion gas 158 may also be air or a combination of air and inert gas. In some cases, expansion chamber 126 is in fluid communication with flow passage 112. An interior volume defined by flexible wall 128 may be adjustable to accommodate pressure fluctuations in flow passage 112. The methods described herein may include accommodating pressure fluctuations in the fermentation apparatus through the use of expansion chamber 126. It will be understood that while expansion chamber 126 may contain expansion gas 158 therein, expansion gas 158 may be replaced by headspace fluid mixture 150 or modified fluid 156 as the fermentation of beverage 102 progresses. Expansion chamber 126 may be located at a point other than as exemplified in FIG. 2 that is in fluid communication with flow passage 112 or headspace 114. Release valve 124 may serve as a port to add or remove gas from the headspace circuit, including expansion chamber 126.

Figure 3:
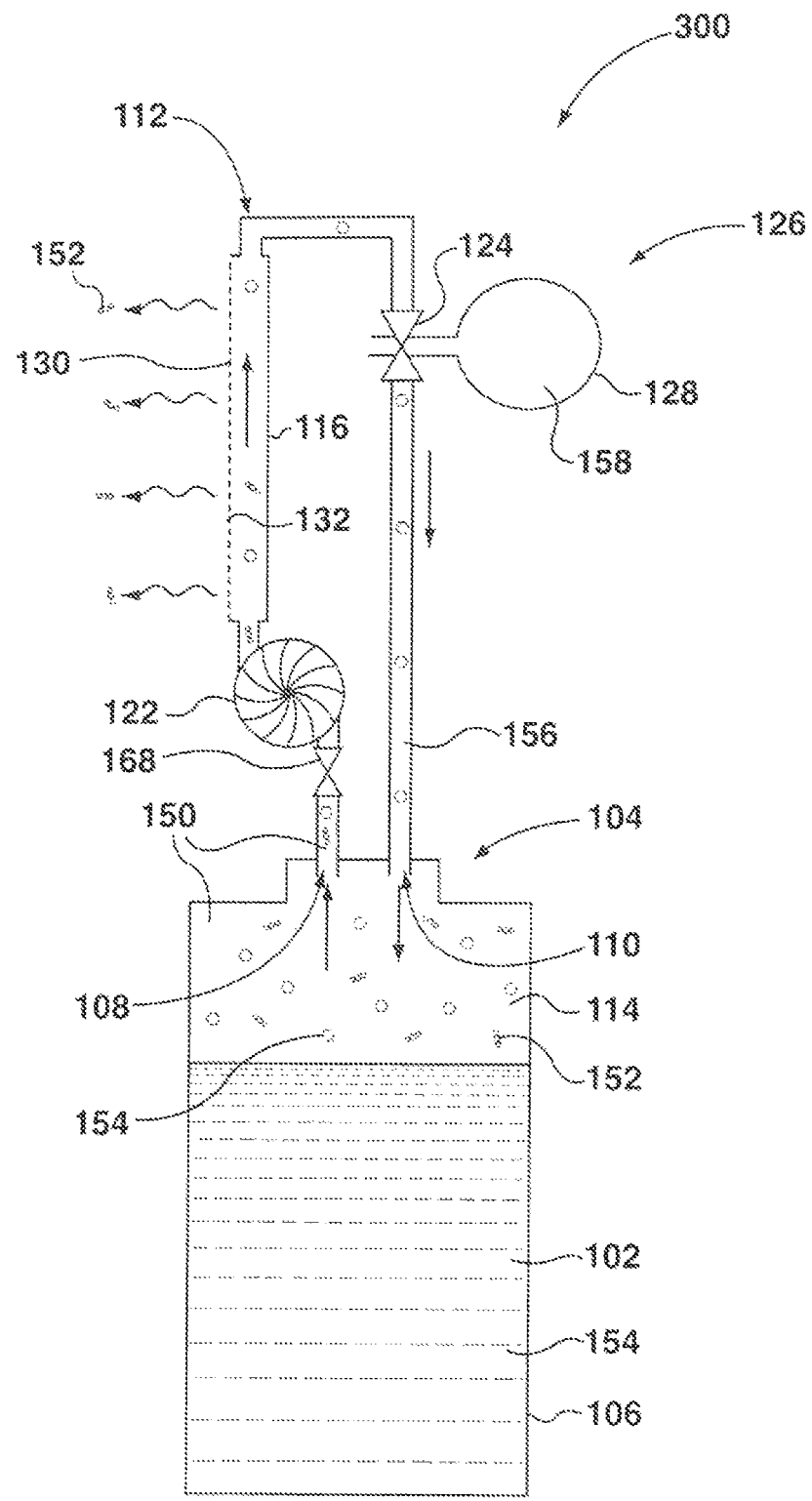
FIG. 3 is a cut-away side view of a fermentation apparatus in accordance with yet another embodiment comprising a carbon dioxide selective membrane.

FIG. 3 exemplifies a third embodiment of a fermentation apparatus 300. It will be appreciated that for simplicity and clarity of illustration, elements of fermentation apparatus 300 corresponding or analogous to elements of fermentation apparatus 100 and/or 200 are labeled with the same reference numerals as for fermentation apparatuses 100 and/or 200. For brevity, the description of similar or corresponding elements is not repeated.

As exemplified in FIG. 3, carbon dioxide scrubber 116 may be, or may include, carbon dioxide selective membrane 130. In some embodiments, carbon dioxide selective membrane 130 permits carbon dioxide gas 152 in headspace fluid mixture 150 to pass therethrough and out of flow passage 112. In some cases, carbon dioxide selective membrane 130 retains aromatic fluid 154 in headspace fluid mixture 150 within flow passage 112. In some cases, carbon dioxide selective membrane 130 substantially retains aromatic fluid 154 in headspace fluid mixture 150 within flow passage 112.

Continuing to refer to FIG. 3, in some embodiments, a pressure greater than atmospheric pressure may exist on interior surface 132 of the carbon dioxide selective membrane 130. Increasing the pressure on interior surface 132 encourages carbon dioxide gas 152 to pass through carbon dioxide selective membrane 130 and out of flow passage 112. In some cases, the pressure on interior surface 132 of carbon dioxide selective membrane 130 is generated by fluid pump 122. In some embodiments, carbon dioxide selective membrane 130 may be of sufficient permeability and have a sufficient surface area to accommodate the maximum rate of production of carbon dioxide gas 152 produced by the fermentation of the beverage 102. In some embodiments, carbon dioxide selective membrane 130 is not capable of eliminating the maximum rate of carbon dioxide production, but the partial removal of carbon dioxide gas 152 from flow passage 112 can still enhance the aroma and/or taste of fermentable beverage 102. In these embodiments, carbon dioxide gas 152 produced in excess of the carbon dioxide removal rate of carbon dioxide selective membrane 130 may exit flow passage 112 through relief valve 124 to prevent over pressurization of the system.

Referring to FIG. 3, the methods described herein may include contacting headspace fluid mixture 150 with carbon dioxide selective membrane 130, carbon dioxide selective membrane 130 permitting carbon dioxide gas 152 in headspace fluid mixture 150 to pass through carbon dioxide selective membrane 130 and out of the flow passage 112, and retaining aromatic fluid 154 in headspace fluid mixture 150 in flow passage 112. In some cases, carbon dioxide selective membrane 130 substantially retains aromatic fluid 154 in flow passage 112.

In some cases, all of carbon dioxide gas 152 in headspace fluid mixture 150 may not pass through carbon dioxide selective membrane 130, and some of aromatic fluid 154 may pass through carbon dioxide selective membrane 130 and be lost. However, in some cases, by permitting at least a portion of carbon dioxide gas 152 to pass through carbon dioxide selective membrane 130 and retaining at least a portion of aromatic fluid 154 in flow passage 112 and thereby retaining modified fluid 156 in flow passage 112, carbon dioxide selective membrane 130 can improve the quality of the fermented beverage 102 by increasing the amount of aromatic fluid compounds in the final beverage after fermentation.

Continuing to refer to FIG. 3, in some embodiments, the carbon dioxide selective membrane 130 includes at least one of: a planar membrane, a plurality of stacked planar membranes, a tubular hollow membrane and a bundle of tubular hollow membranes.

Continuing to refer to FIG. 3, in some embodiments, carbon dioxide selective membrane 130 is a diffusive membrane that permits carbon dioxide gas 152 to diffuse therethrough and out of the flow passage 112. In other embodiments, selective membrane 130 is a chemically activated membrane that utilizes chemical reactions between a membrane surface material and a contacting fluid to convey the fluid through the membrane. Non-limiting examples of selective membrane 130 include a fixed-site-carrier membrane, microporous organic polymer membrane, mixed matrix membrane, carbon molecular sieve membrane, inorganic membrane or a polypropylene hollow fiber membrane. Some, like a fixed-site-carrier membrane, for example, are more efficient under the conditions of fermentation which include atmospheric pressure, temperature near room temperature and the presence of water vapour.

Figure 4:
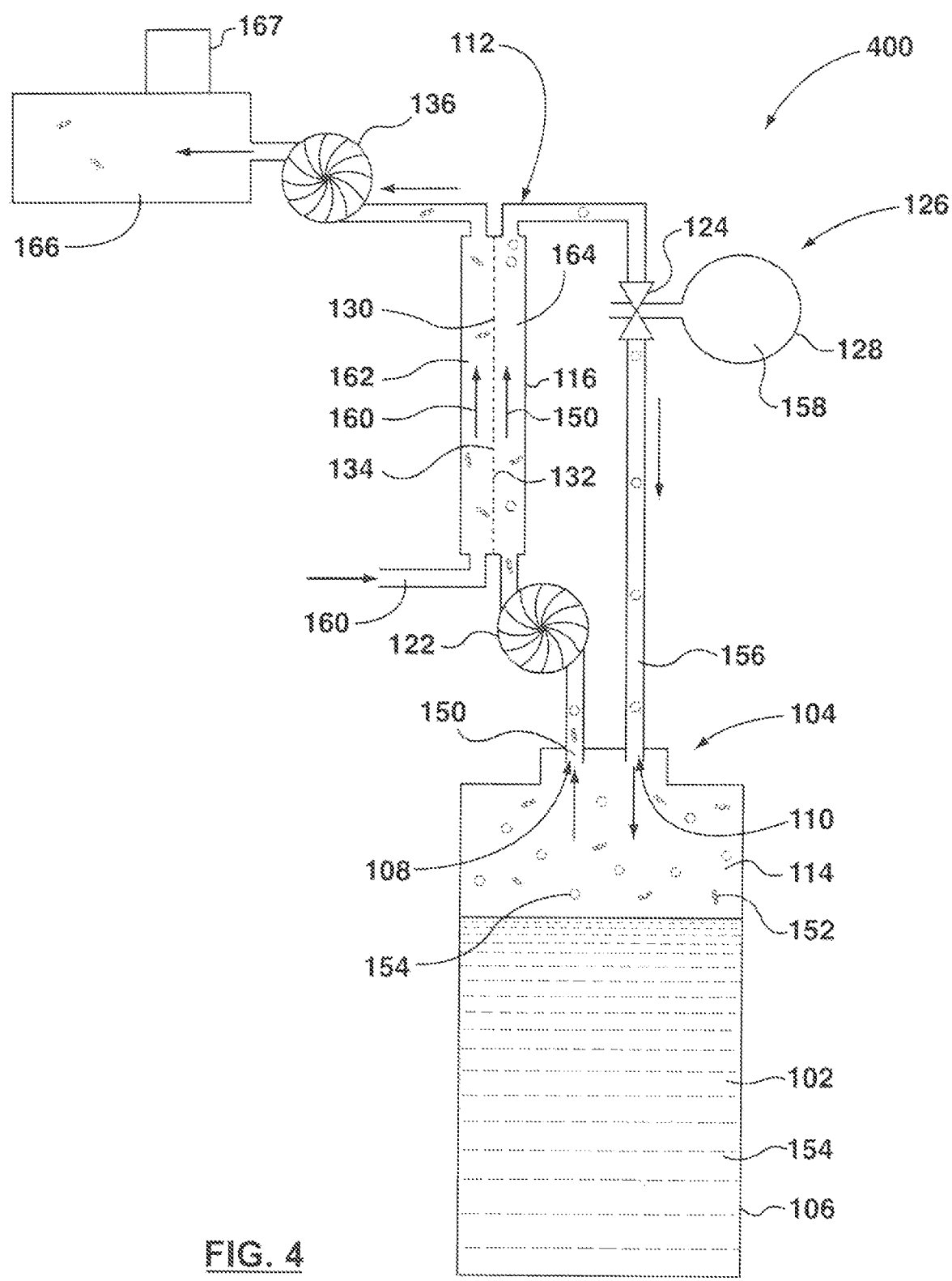
FIG. 4 is a cut-away side view of a fermentation apparatus in accordance with a further embodiment comprising a carbon dioxide selective membrane and a sweep gas flow via a negative pressure system.

FIG. 4 exemplifies a fourth embodiment of a fermentation apparatus 400. It will be appreciated that for simplicity and clarity of illustration, elements of fermentation apparatus 400 corresponding or analogous to elements of fermentation apparatus 100, 200 and/or 300 are labeled with the same reference numerals as for fermentation apparatus 100, 200 and/or 300. For brevity, the description of similar or corresponding elements is not repeated.

As exemplified in FIG. 4, in some embodiments, sweep gas 160 is directed across exterior surface 134 of carbon dioxide selective membrane 130. In some cases, sweep gas 160 is a sweep gas that contains little or no carbon dioxide gas. Examples of sweep gas 160 include, but are not limited to, air having a low carbon dioxide content, an inert gas, a plurality of inert gases, or a combination thereof. In some cases, the air having a low carbon dioxide content has a carbon dioxide concentration of equal to or less than about 0.04%. In some cases, the air having a low carbon dioxide content has a carbon dioxide concentration of approximately 0.04%. More specifically, sweep gas 160 may be nitrogen, helium, hydrogen or argon. In some cases, exterior surface 134 of carbon dioxide selective membrane 130 is located external to flow passage 112. In some cases, sweep gas 160 lowers the carbon dioxide partial pressure on exterior side 162 of carbon dioxide selective membrane 130 relative to flow passage side 164 of the carbon dioxide selective membrane 130. In these cases, this facilitates the passage of carbon dioxide gas 152 through carbon dioxide selective membrane 130 and out of flow passage 112.

The methods described herein may include directing sweep gas 160 across exterior surface 134 of carbon dioxide selective membrane 130 to facilitate the passage of carbon dioxide gas 152 through carbon dioxide selective membrane 130 and out of flow passage 112.

Continuing to refer to FIG. 4, in some embodiments, negative pressure generator 136 is located external to flow passage 112. A suitable negative pressure generator may include, but is not necessarily limited to, a centrifugal blower, regenerative blower, positive displacement blower or an axial fan. In some embodiments, a plurality of negative pressure generators is used. In some cases, negative pressure generator 136 directs sweep gas 160 across exterior surface 134 of carbon dioxide selective membrane 130. In some embodiments, a lower pressure exists on exterior surface 134 of carbon dioxide selective membrane 130 than on interior surface 132. This lower pressure increases the carbon dioxide partial pressure difference across the membrane and may be generated by negative pressure generator 136. In some embodiments, positive pressure on the flow passage side 164 from fluid pump 122, or a combination of both negative pressure generator 136 and positive pressure from fluid pump 122 increase the carbon dioxide partial pressure difference across the membrane. This pressure differential across carbon dioxide selective membrane 130 encourages carbon dioxide gas 152 in headspace fluid mixture 150 to pass through carbon dioxide selective membrane 130 and out of flow passage 112. Furthermore, in some cases, negative pressure generator 136 permits decreased total pressure on exterior side 162 of selective membrane 130 to thereby facilitate the passage of carbon dioxide gas 152 in headspace fluid mixture 150 through carbon dioxide selective membrane 130 and out of flow passage 112. In some cases, fluid pump 122 permits increased total pressure on flow passage side 164 of selective membrane 130 to thereby facilitate the passage of carbon dioxide gas 152 in headspace fluid mixture through carbon dioxide selective membrane 130 and out of flow passage 112.

Some embodiments of the methods described herein include releasing carbon dioxide gas 152 that exits flow passage 112 via carbon dioxide scrubber 116 to the external atmosphere. Referring to FIG. 4, some embodiments of the methods described herein include transferring all (or part) of carbon dioxide gas 152 that exits flow passage 112 via carbon dioxide scrubber 116 to a carbon dioxide storage vessel 166 that is fluidly connected to carbon dioxide scrubber 116. Carbon dioxide storage vessel 166 may be connected to compressor unit 167 which condenses the carbon dioxide that travels into carbon dioxide storage vessel 166, and thereby allows more carbon dioxide gas to be stored in carbon dioxide storage vessel 166. It may be desirable to store carbon dioxide gas 152 in a storage vessel 166 where environmental regulations restrict the release of carbon dioxide gas 152 to the environment, or where carbon dioxide gas 152 can be utilized in other processes. These reasons for storing the carbon dioxide gas 152 are merely illustrative and are not meant to limit the methods described herein.

Figure 5:
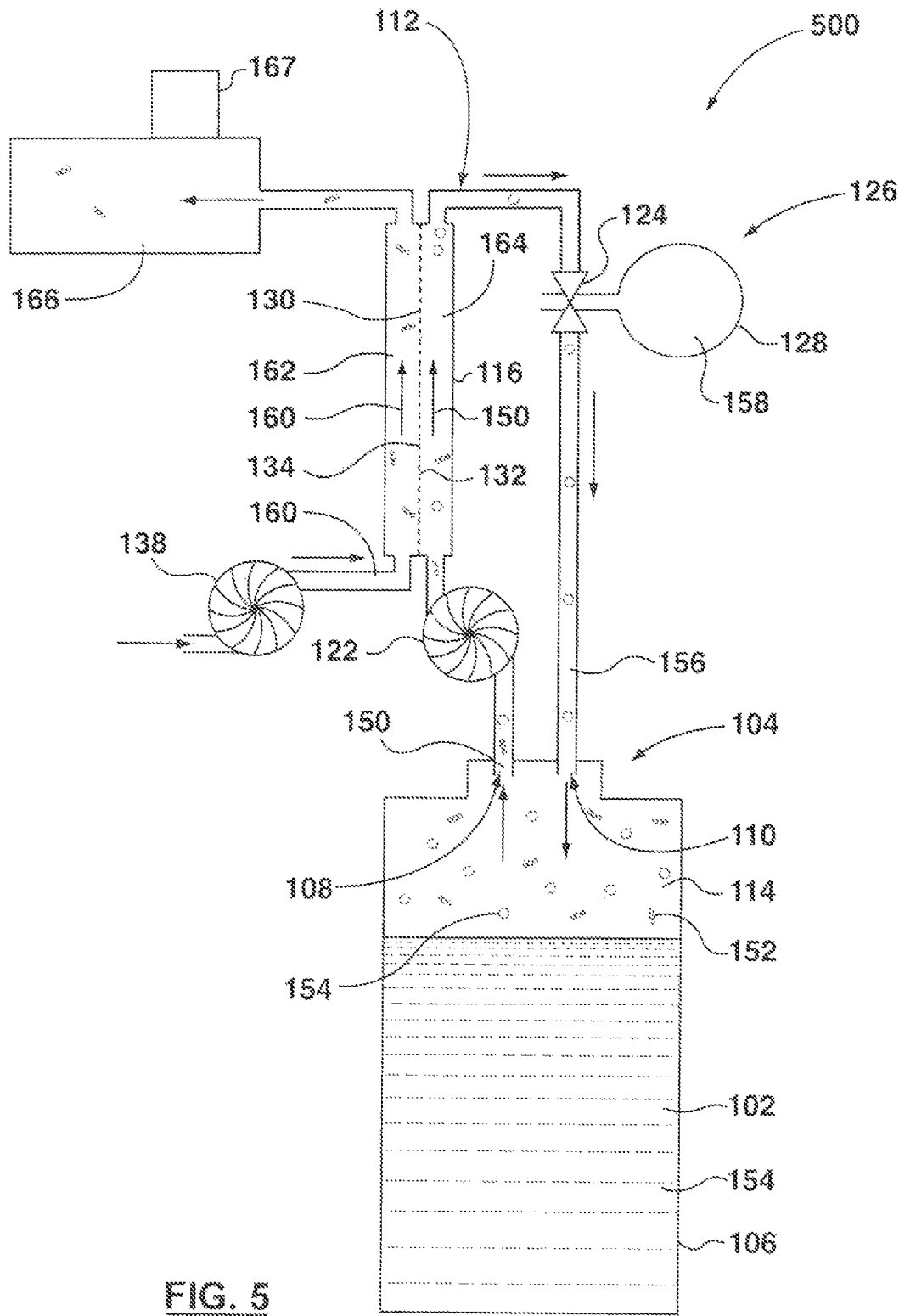
FIG. 5 is a cut-away side view of a fermentation apparatus in accordance with a further embodiment comprising a carbon dioxide selective membrane and a sweep gas flow via a positive pressure system.

FIG. 5 exemplifies a fifth embodiment of a fermentation apparatus 500. It will be appreciated that for simplicity and clarity of illustration, elements of fermentation apparatus 500 corresponding or analogous to elements of fermentation apparatus 100, 200, 300 and/or 400 are labeled with the same reference numerals as for fermentation apparatus 100, 200, 300 and/or 400. For brevity, the description of similar or corresponding elements is not repeated.

Continuing to refer to FIG. 5, in some embodiments, positive pressure generator 138 may be located external to flow passage 112. Positive pressure generator 138 may direct sweep gas 160 across exterior surface 134 of carbon dioxide selective membrane 130. Although the use of positive pressure, in itself, may slightly elevate the total pressure on exterior side 162 of selective membrane 130, in some cases, the flow of sweep gas 160 generated by positive pressure generator 138 may facilitate a large carbon dioxide partial pressure difference between the exterior side 162 and the flow passage side 164, to facilitate carbon dioxide gas passage through selective membrane 130.

FIGS. 4 and 5 exemplify sweep gas 160 moving across exterior surface 134 of selective membrane 130 and headspace fluid mixture 150 moving across interior surface 132 of selective membrane 130 and travelling in substantially the same flow direction to one another. In some alternative embodiments, sweep gas 160 and headspace fluid mixture 150 flow in substantially opposite directions to one another across opposing surfaces of selective membrane 130.

Figure 6:
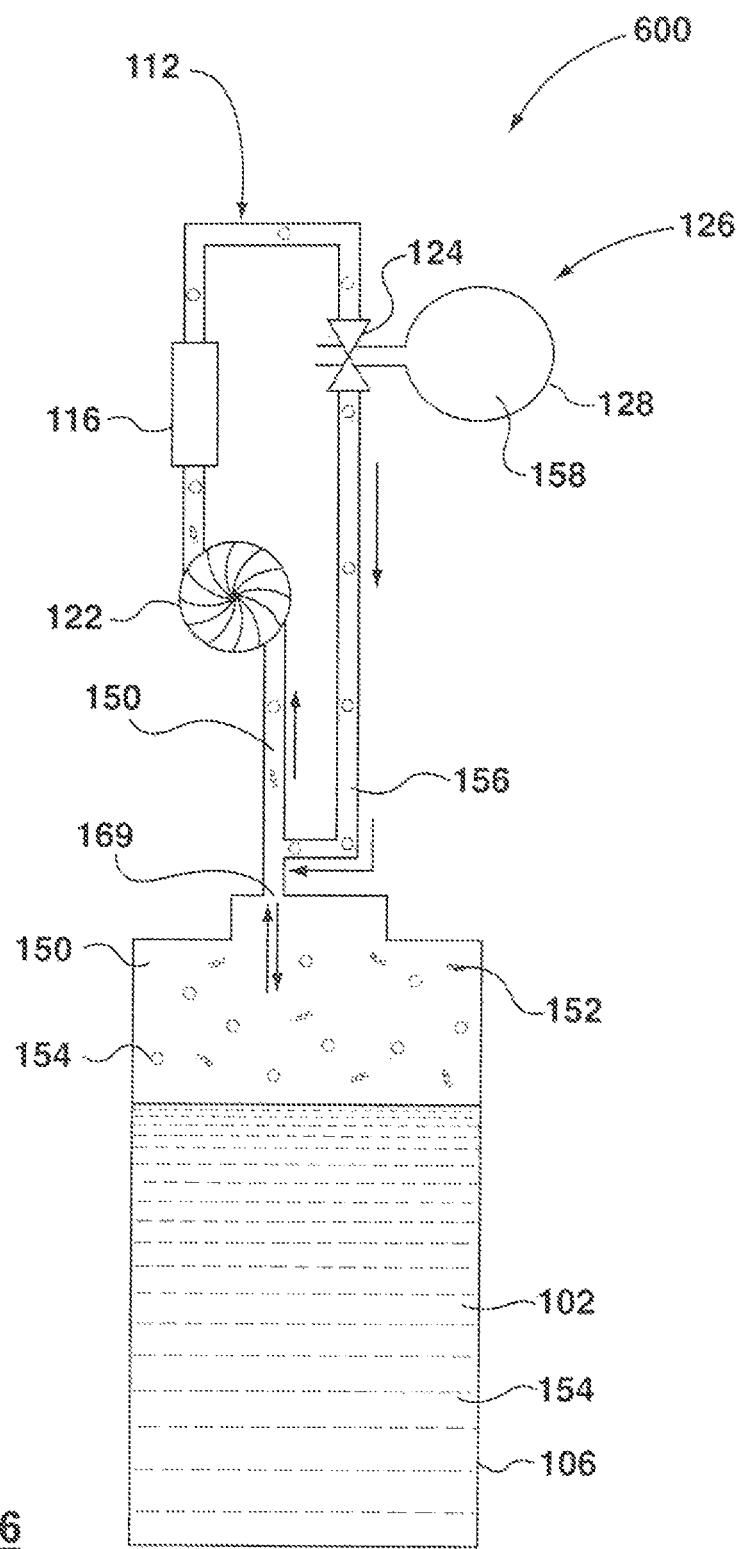
FIG. 6 is a side elevation view of a fermentation apparatus in accordance with a further embodiment in which the beverage container has a single port.

FIG. 6 exemplifies a sixth embodiment of a fermentation apparatus 600. It will be appreciated that for simplicity and clarity of illustration, elements of fermentation apparatus 500 corresponding or analogous to elements of fermentation apparatus 100, 200, 300, 400 and/or 500 are labeled with the same reference numerals as for fermentation apparatus 100, 200300, 400 and/or 500. For brevity, the description of similar or corresponding elements is not repeated.

Fermentation apparatus 600 shown in FIG. 6 is similar in some respects to fermentation apparatus 100 shown in FIG. 1. Fermentation container 106 of fermentation apparatus 100 has exit port 108 and reentry port 110, which are separate ports from one another. Unlike fermentation apparatus 100, fermentation apparatus 600 has a combination port 169 (FIG. 6), which functions as both exit port 108 and reentry port 110 (FIG. 1). In some cases, as shown in apparatus 600, fluid pump 122 facilitates flow through flow passage 112 and the dual operation of combination port 169. As exemplified in FIG. 6, fermentation apparatus 600 includes an expansion chamber 126 having flexible wall 128 and containing expansion gas 158 therein.

It will be appreciated that each aromatic fluid has different production, loss and retention curves depending on such factors as its gas/liquid partition coefficient, the temperature, and the level of carbon dioxide production. Preservation of aromatic fluid may be enhanced in the final beverage by reducing carbon dioxide stripping with carbon dioxide filtration or carbon dioxide absorption and headspace recirculation, as described above in accordance with embodiments of this disclosure.

In some wine fermentation processes, most of the yeast-derived aromatic fluid is produced and lost early in fermentation. Consider the example of fermenting a 1000 L of grape juice with 24° Brix (24 g of sucrose per 100 g of solution), specific gravity of 1.100 (using a hydrometer corrected to 15.6° Celsius, with water as the reference solution), and an initial sugar content of 264 g/L. When fermenting 1000 L of this juice the carbon dioxide gas flow from the start of initial yeast growth would be expected to gradually increase up to a peak carbon dioxide gas flow of about 750 L/hour at about 1½ days after the start of the yeast growth. After peaking, the carbon dioxide gas flow rate would be expected to decrease, and about four days from the start of yeast growth, there may be a carbon dioxide flow rate of about 225 L/Hr. Production of yeast-derived aroma compounds begins at about the time of peak carbon dioxide gas flow rate. In this example, the production of yeast-derived aroma compounds would be expected to reach a peak two to four days after peak carbon dioxide production. In this example, total fermentation time would be expected to be more than two weeks. The final concentration of individual aroma compounds contained in a wine at the end of fermentation varies widely and depends on a wine's individual production rates and an aroma compound's susceptibility to being stripped by the continuing carbon dioxide flow rate. Since a higher carbon dioxide gas flow rate represents a higher alcohol production rate (i.e. fermentation rate), it is evident that, in at least some cases, a large proportion of the alcohol, carbon dioxide gas and aromatic fluid production occurs relatively early in the overall fermentation process. In this example, it is expected that approximately 40% of aroma compound loss would occur between days one and four, and an additional approximately 20% of aroma compound loss would occur between day four and the end of fermentation (for a total aroma compound loss of 60% over the entire duration of fermentation).

Consequently, in some embodiments disclosed herein the methods for preserving aroma may be conducted for only a portion of the fermentation process, such as the first portion of fermentation only. In some cases, the first portion is less than one week. In some cases, the first portion is approximately three days in duration. Thereafter, carbon dioxide gas may be allowed to escape from flow passage 112 without the use of a carbon dioxide scrubber 116 (FIGS. 1 to 6 exemplify carbon dioxide scrubber 116). The decrease in sugar concentration and the increase in ethanol typically both decrease partition coefficients. This typically decreases the loss of aroma in the latter part of fermentation.

In some cases of wine fermentation, reducing carbon dioxide stripping for the first week of fermentation, through the use of a carbon dioxide scrubber 116 as described above and illustrated in FIGS. 1 to 6, may retain approximately 80% of the maximum desirable aroma and have a positive impact on the quality of the final fermented wine. It will be appreciated that in other cases of wine fermentation, employing a carbon dioxide scrubber 116 as described above and illustrated in FIGS. 1 to 6 for the first week of fermentation, may reduce the carbon dioxide stripping to that point so that less than 80% of the maximum desirable aroma is retained, yet still have a positive impact on the quality of the final fermented wine.

In addition to aroma preservation, there may be other advantages to carbon dioxide removal during fermentation, such as allowing higher temperatures for white wine fermentation, which may shorten the time required to make white wine. In addition, in some cases, higher temperatures make the yeast fermentation more reliable. Additional advantages of the described methods and apparatus may become apparent upon reading this description.

Referring back now to FIG. 1, the methods described herein may include carbon dioxide scrubber 116 being capable of removing carbon dioxide gas 152 from flow passage 112 at a removal rate at least as high as the maximum production rate at which carbon dioxide gas 152 is produced in the headspace 114 by the fermentation of beverage 102.

Continuing to refer to FIG. 1, some embodiments of the methods described herein include allowing headspace fluid mixture 150 to flow through flow passage 112 into contact with carbon dioxide scrubber 116 during the entire duration of the fermentation. Some alternative embodiments of the methods described herein include allowing headspace fluid mixture 150 to flow through flow passage 112 into contact with carbon dioxide scrubber 116 during less than the entire duration of the fermentation. Carbon dioxide scrubber 116 may be used for any part of, or for the entire duration of, fermentation. Carbon dioxide scrubbers incapable of eliminating the maximum rate of carbon dioxide production may still be used with the beneficial effect of preserving some of the aroma compounds in a fermenting beverage.

Figure 7:
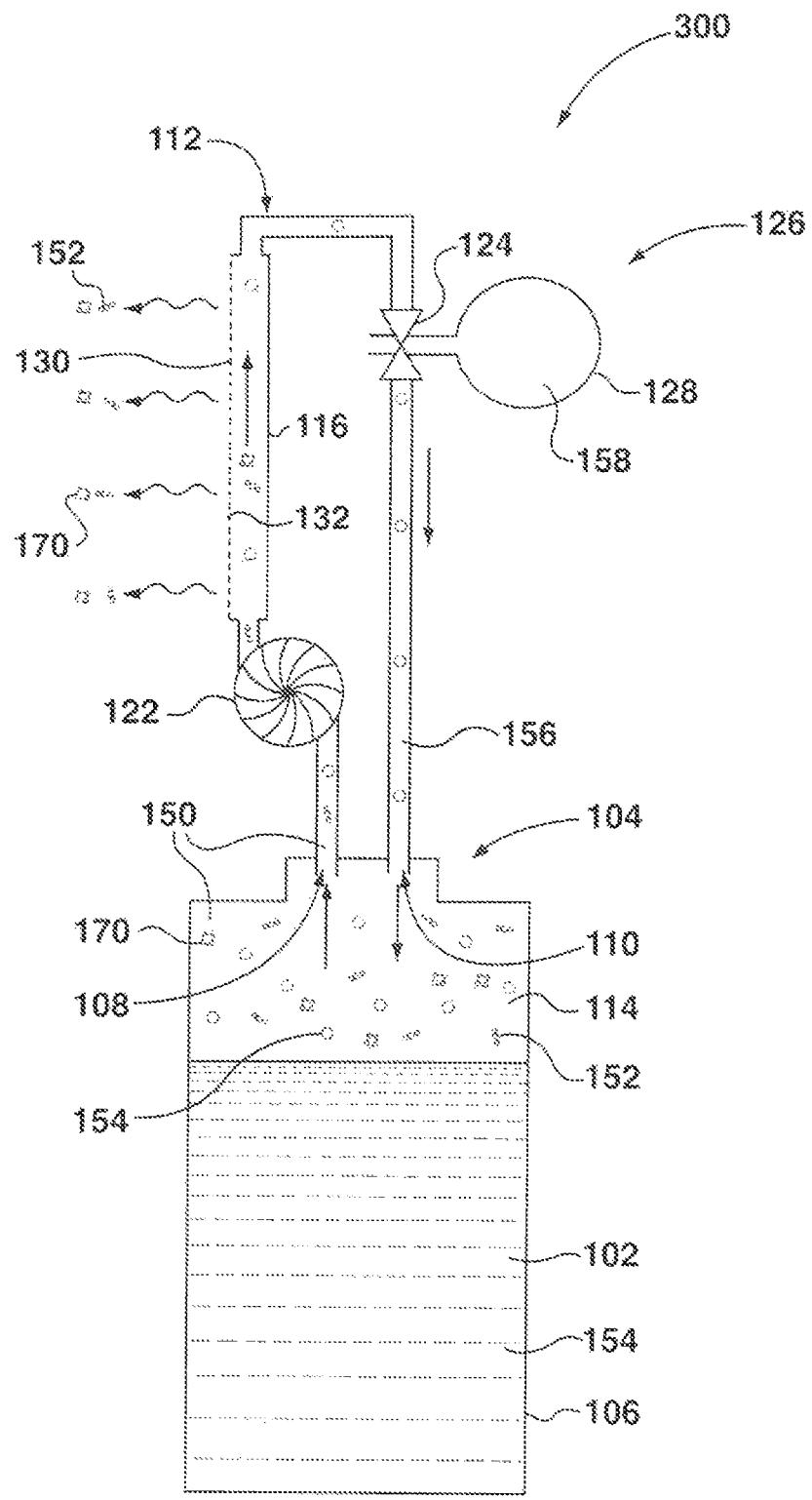
FIG. 7 is a side elevation view of the fermentation apparatus of FIG. 3 operating with a headspace fluid mixture comprising aromatic fluid, carbon dioxide gas and undesirable waste by-products.

FIG. 7 exemplifies fermentation apparatus 300 (the apparatus shown in FIG. 3) operated in the presence of waste by-products 170. Referring to FIG. 7, in some of the methods described herein, fermentation of beverage 102 produces undesirable waste by-products 170 in headspace 114, in addition to aromatic fluid 154. Exemplary aromatic fluids 154 (which enhance taste and/or smell) include, but are not limited to, ethyl hexanoate, ethyl buryrate, ethyl octanoate, isoamylacetate and hexylacetate. By contrast, exemplary undesirable waste by-products 170 (which produce an unpleasant taste and/or smell) include, but are not limited to: hydrogen sulfide, acetic acid, hexanoic acid and methyl mercaptan. In these cases, headspace fluid mixture 150 contains both aromatic fluid 154 and undesirable waste by-products 170. In some cases, depending on the type of carbon dioxide scrubber 116 employed and the type of waste by-products 170 present, waste by-products 170 may be removed from flow passage along with carbon dioxide gas 152, as shown in FIG. 7. In some cases, substantially all of waste by-products 170 flow through selective membrane 130 and are substantially removed from flow passage 112, as exemplified in FIG. 7. In alternative embodiments, waste by-products 170 may be partially retained in flow passage 112 along with aromatic fluid 154, with only a portion of waste by-products exiting flow passage 112 via selective membrane 130.

Figure 8:
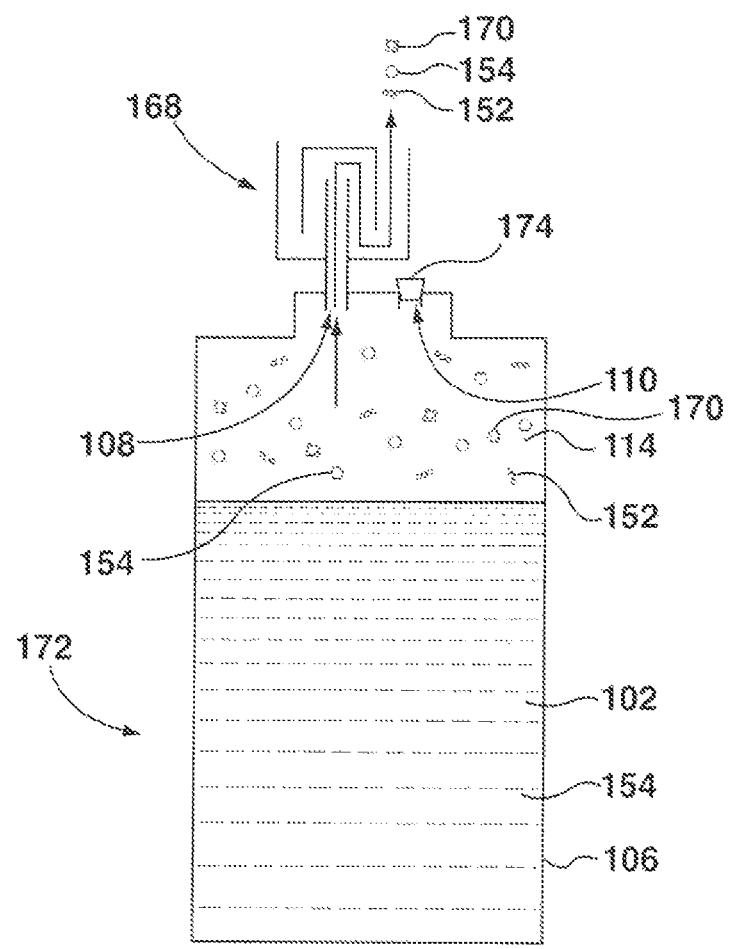
FIG. 8 is a side elevation view of a modified fermentation container operating with a headspace fluid mixture comprising aromatic fluid, carbon dioxide gas and undesirable waste by-products.

FIG. 8 exemplifies modified fermentation container 172. Modified fermentation container 172 permits headspace fluid mixture 150 to escape from flow passage 112 via airlock 168. As exemplified in FIG. 8, airlock 168 covers exit port 108 and stopper 174 fluidly seals reentry port 110. In cases wherein the beverage container has only one port (see combination port 169 in FIG. 6, for example), airlock 168 covers the one port and stopper 174 is not necessarily required. In other embodiments, each port may be covered by a corresponding airlock 168. Airlock 168 is a conventional airlock that allows internal gases to escape a container while preventing the inflow of external gases to a container. When airlock 168 covers and partially seals a port, it prevents external oxygen from entering modified fermentation container 172, but permits aromatic fluid 154, carbon dioxide gas 152 and waste by-products 170 in headspace fluid mixture 150 to escape from flow passage 112 via airlock 168.

FIG. 7 exemplifies substantially all waste by-products 170 passing through selective membrane 130 and out of flow passage 112. However, in some cases, some waste by-products 170 may be retained in flow passage 112. Unlike fermentation container 106 shown in FIG. 7, modified fermentation container 172 (exemplified in FIG. 8) replaces flow passage 112 with airlock 168 and stopper 174. Airlock 168 of modified fermentation container 172 (FIG. 8) allows headspace fluid mixture 150 to escape from the flow passage 112 to the external atmosphere (or into a separate vessel) and permits desirable aromatic fluid 154, undesirable waste by-products 170 and carbon dioxide gas 152 produced during fermentation, to escape. Advantageously, the undesirable waste by-products 170 are allowed to escape from flow passage 112 via airlock 168 and are not reintroduced into fermentable beverage 102.

In some embodiments, a fermentation apparatus (ex. fermentation apparatus 300, FIG. 7) and a modified beverage container (e.g. modified fermentation container 172) may be used in combination to allow a sufficient amount of desirable aromatic fluids to be retained in the flow passage during a first portion of the fermentation process (as shown in FIG. 7), and a sufficient amount of undesirable waste by-products to be permitted to escape from the flow passage during a second (i.e. later) portion of the fermentation process (as shown in FIG. 8). In this manner, a fermented beverage may be obtained having a sufficiently high concentration of desirable aromatic compounds and a sufficiently low concentration of undesirable waste by-product compounds. In some of the methods described herein, the first portion of fermentation may, for example, be the first week of fermentation (in which a significant portion of desirable aromatic compounds may be preserved, in some cases). In some of the methods described herein, the first portion of fermentation may be more or less than the first week of the fermentation process.

In some embodiments, the fermentation apparatus has a carbon dioxide absorber (see carbon dioxide absorber 118 of fermentation apparatus 200 in FIG. 2, for example). In some cases, substantially all waste by-products may be removed from flow passage 112 by carbon dioxide absorber 116. In other cases, some waste by-products may not be fully absorbed by carbon dioxide absorbing material 120, and may be retained in flow passage 112. In the case of the latter, a fermentation apparatus (e.g. 200, FIG. 2) may be used for a first portion of the fermentation process, and a modified beverage container (e.g. 172, FIG. 7) may be used for a second portion of the fermentation process. It will be appreciated that the second portion follows the first portion of the fermentation process.

EXEMPLARY EXPERIMENTAL IMPLEMENTATIONS

Experiment #1

A first experimental embodiment is discussed below with reference to FIG. 9 and exemplary fermentation apparatus 700.

After crushing and pressing the juice from Pinot Gris grapes, fermentation was started with ICV-D47™ yeast (sold by Lallemand™ Inc., Montreal, Quebec, Canada), which is a yeast known for producing wines with typically well-regarded aroma. A portion of the juice, identified as the control juice, was placed in a fermentation container. Fermentation of the control wine was conducted in a sealed container with an airlock to allow carbon dioxide gas to freely escape while limiting oxygen exposure. It was noticed that wine juice aromas were coming out of the airlock and the carbon dioxide gas was carrying away the very aromas desired in the finished control wine.

Figure 9:
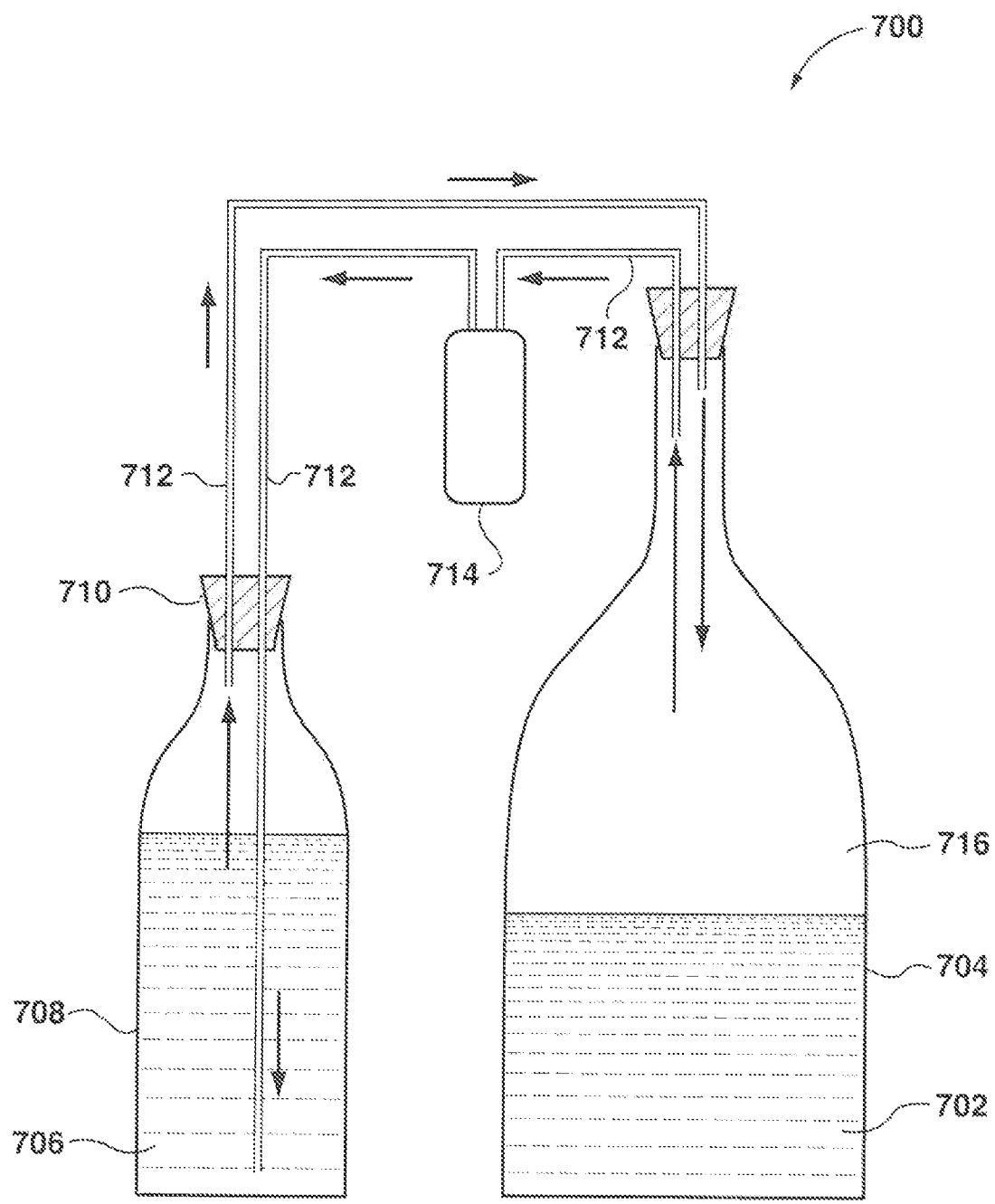
FIG. 9 is a side elevation view of a fermentation apparatus in accordance with a first experimental embodiment.

Referring to FIG. 9, approximately 48 hours after fermenting the juice in the control container (as outlined in the paragraph above), a portion of the control juice (one litre) was drained into a two liter glass jug 704 (see experimental juice 702). This one litre of juice was the experimental juice to be fermented into an experimental wine. Approximately 0.8 litres of soda lime carbon dioxide absorber 706 was poured into a one liter plastic container 708 fitted with a rubber stopper 710. A tube 712 carried carbon dioxide gas and aromatic fluid via a sealed aquarium pump 714 from headspace 716 above juice 702 to the bottom of the soda lime carbon dioxide absorber 706 where it then traveled upwards through carbon dioxide absorber 706 and back into headspace 716 of two liter glass jug 704 containing fermenting juice 702. The absorption of carbon dioxide gas via carbon dioxide absorber 706 was started just after the peak carbon dioxide production of fermenting juice 702 was achieved, and continued until the end of the its fermentation. The completeness of carbon dioxide absorption by the soda lime in carbon dioxide absorber 706 was evidenced by the lack of pressure increase inside glass jug 704 and in the plastic container 708 during fermentation. After the fermentation was complete, the control wine and the one liter experimental wine were tasted and the aroma was judged to be more intense and have a more fruity smell and taste in the one liter experimental sample that had its carbon dioxide gas removed and some of its aroma preserved, using the above described fermentation apparatus 700. This taste difference was noted despite the fact that the juice treated with the above described fermentation apparatus 700 had already undergone some fermentation with carbon dioxide aroma stripping before the experimental juice 802 was set up as illustrated FIG. 9.

Experiment #2

A second experimental embodiment is discussed below with reference to FIG. 10 and exemplary fermentation apparatus 800.

Pinot Gris grapes were picked and pressed to yield 52 litres of juice. This pressed juice had the following initial properties: Brix of 22.2° (22.2 g of sucrose per 100 g of solution), specific gravity of 1.100 using a hydrometer corrected to 15.6° Celsius with water as the reference solution, titratable acidity of 6.5 grams/litre, and pH of 3.30. Potassium metabisulfite, in a quantity of 2.2 grams, was added to the juice to obtain a molecular sulfur dioxide content of 0.80 parts per million.

The pressed juice was allowed to settle for 30 hours under a controlled, cool climate in which the surrounding temperature was held at approximately 10° Celsius.

The settled juice was then racked into a clean container into which the following ingredients were added to treat the juice: 14.7 g of OptiWHITE™ (sold by Lallemand™ Inc., Montreal, Quebec, Canada), 1.5 ml of Antifoam FG9030™ (sold by Vinquiry™, Windsor, Calif., U.S.A.), 12.3 g of Fermaid-K™ (sold by Lallemand™ Inc., Montreal, Quebec, Canada), and 1.2 g of hydrated BA11™ yeast (sold by Lallemand™ Inc., Montreal, Quebec, Canada). The juice was inoculated with the BA11™ yeast. The treated juice was then thoroughly stirred and transferred into two clean fermentation containers, with 24 litres of juice and approximately 6 litres of headspace in each container. One container was filed with the 24 litres of juice 802 and labelled "experimental" (see experimental container 804 of fermentation apparatus 800 in FIG. 10). The other fermentation container was labelled "control" and was fitted with a common airlock to allow carbon dioxide gas to freely escape to the atmosphere from the control container. The control container and experimental container were both flushed with argon gas prior to fermentation, to remove oxygen from the system.

Figure 10:
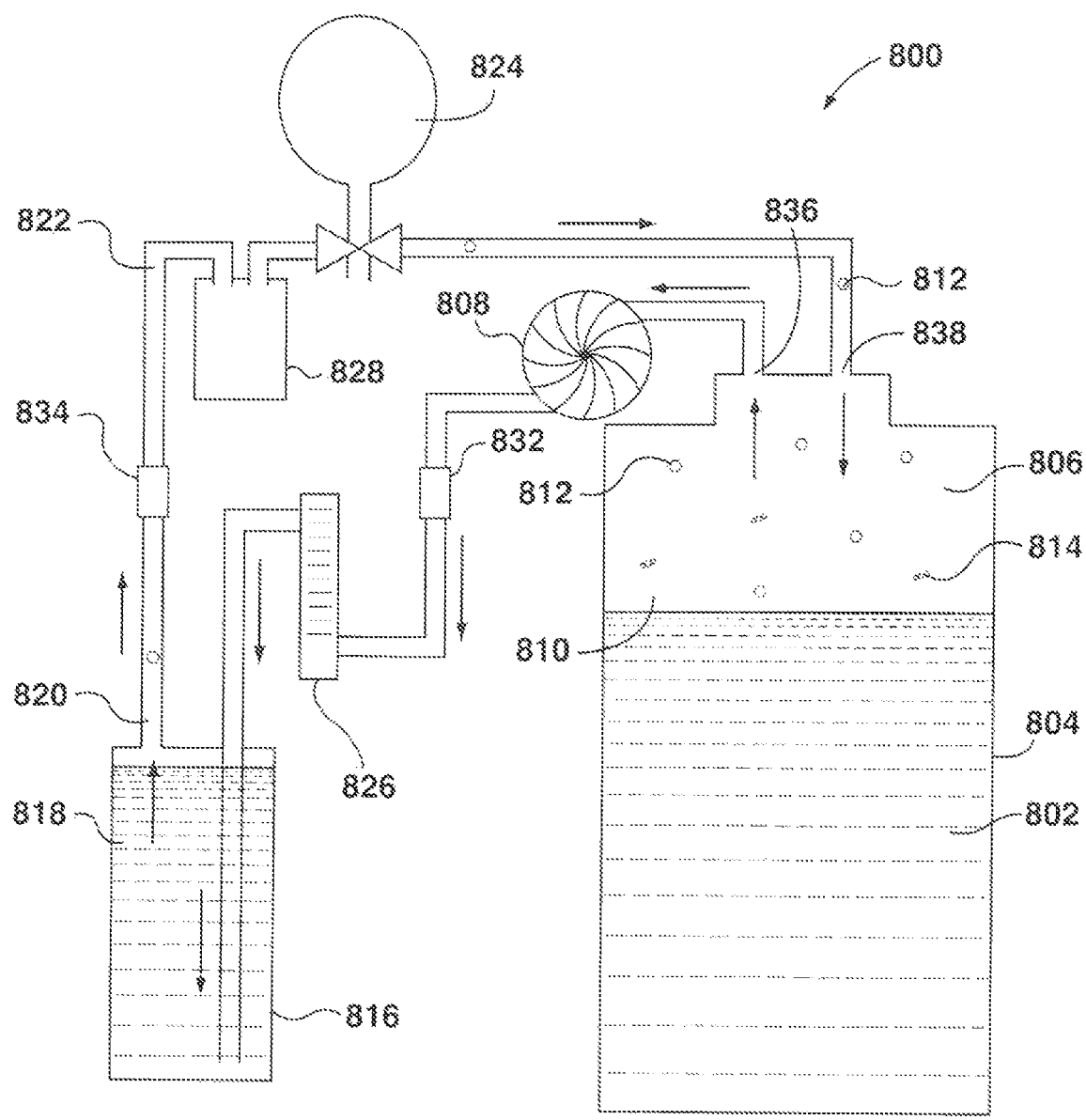
FIG. 10 is a side elevation view of a fermentation apparatus in accordance with a second experimental embodiment.

FIG. 10 illustrates headspace 806 above juice 802. Headspace 806 contained aromatic fluid 812 and carbon dioxide gas 814 during fermentation. An airtight pump 808 circulated headspace fluid mixture 810 (including aromatic fluid 812 and carbon dioxide gas 814) from headspace 806 through a sealed carbon dioxide absorber 816. Carbon dioxide absorber 816 contained four litres of carbon dioxide absorbing material 818 in the form of Spherasorb™ soda lime (sold by Trudell Medical Marketing™ Ltd., Surrey, BC, Canada). Pump 808 also circulated a modified fluid 820 from carbon dioxide absorber 816 through flow passage 822 and back into headspace 806.

Prior to fermentation of juice 802, headspace 806, flow passage 822, carbon dioxide absorber 816 and expansion chamber 824 were flushed with argon to remove oxygen from the system. Fermentation apparatus 800 included expansion chamber 824 containing argon gas to provide the argon gas to the system and accommodate pressure fluctuations in flow passage 822. Fermentation apparatus 800 also included flow meter 826 to measure the flow of headspace fluid mixture 810 from headspace 806 to carbon dioxide absorber 816. The experimental apparatus also contained water trap 828 for collecting excess moisture created during the soda lime absorption of carbon dioxide gas 814.

The control and experimental containers sat side by side on a flat surface and were exposed to the same temperature range (approximately 15-17° Celsius) during fermentation.

Figure 11:
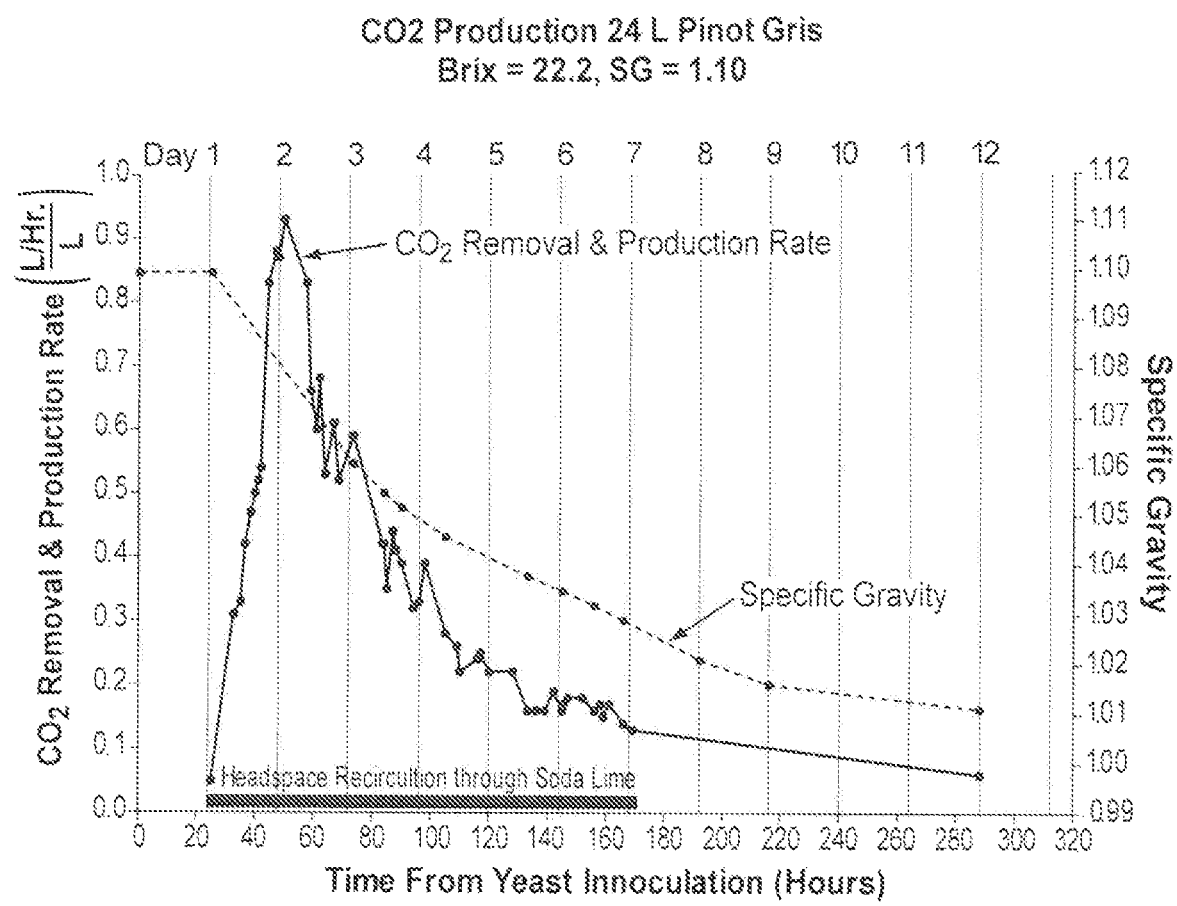
FIG. 11 is a graphical representation of the carbon dioxide gas removal/production rate and specific gravity of a fermented juice vs. fermentation time, as associated with the second experimental embodiment of FIG. 10.

FIG. 11 shows the fermentation dynamics for experimental juice 802 during fermentation. The specific gravity of experimental juice 802 was monitored (using a hydrometer corrected to 15.6° Celsius with water as the reference solution) during the fermentation process. During fermentation, sugar was consumed and alcohol was produced. Since sugar is denser than alcohol, the specific gravity of juice 802 decreased as fermentation progressed, as shown by the specific gravity curve in FIG. 11. The specific gravity did not fluctuate until approximately one day after yeast inoculation, thereby suggesting that alcohol production began about 1 day after yeast inoculation. After about 1 day, carbon dioxide gas production also began, thereby further evidencing the start of alcohol production.

Referring to FIGS. 10 and 11, the rate of removal of carbon dioxide gas 814 from headspace fluid mixture 810 by carbon dioxide absorber 816 was then calculated. Since the carbon dioxide absorber 816 was found to remove all carbon dioxide gas 814 produced during the fermentation experiment, the rate of removal of carbon dioxide was equal to the rate of production of carbon dioxide gas 814 by fermenting experimental juice 802.

Therefore, the rate of removal and production of carbon dioxide ($CO_2$) gas was calculated using the following formula:

$$CO_2 \text{ Removal Rate and Production Rate}\left[\frac{\frac{L}{hour}}{L \text{ of juice}}\right] = \frac{\text{Headspace gas flow(Entry } CO_2 \text{ concentration} - \text{Exit } CO_2 \text{ concentration)} \times 60}{\text{Juice Volume}}$$

wherein
Headspace gas flow=The rate of flow (L/minute) of headspace fluid mixture 810, measured at flow meter 826;
Entry $CO_2$ concentration=Fractional concentration of carbon dioxide gas 814 in the headspace fluid mixture 810, measured at three-way stopcock 832 using a Viasensor™ carbon dioxide analyzer (model G110, AFC International™ Inc., DeMotte, Ind., USA);
Exit $CO_2$ concentration=Fractional concentration of carbon dioxide gas 814 carbon dioxide gas in modified fluid 820, measured at three-way stopcock 834, which at all times of full operability of carbon dioxide absorber 816 was 0.00; and
Juice Volume=The amount of juice 802 in experimental container 804, which remained constant at 24 litres during fermentation.

The above formula provided the amount of carbon dioxide gas 814 removed per hour during the fermentation process (per 1 L of experimental juice 802), as shown graphically vs. fermentation time in FIG. 11. Since carbon dioxide absorber 816 removed all carbon dioxide gas 814 from headspace fluid mixture 810, this formula also represented the amount of carbon dioxide gas 814 produced during fermentation, and thereby, indicated the periods of more active fermentation (and higher aromatic fluid 812 and carbon dioxide gas 814 production).

Referring now to FIG. 11, since fermentation rate can be gauged by the rate of production of carbon dioxide gas 814, the maximum fermentation rate occurred about 50 hours after yeast inoculation. The measured peak rate of carbon dioxide gas production was 0.93 (L/hour)/L of juice, measured at a temperature of 17° Celsius and 711 mmHg of atmospheric pressure. By applying the standard correction for these ambient conditions to standard conditions, this translated to 0.81 (L/hour)/L of juice under conditions of standard temperature and pressure (i.e. 760 mmHg and 0° C.). Following the peak, the rate of production of carbon dioxide gas 814 decreased rapidly and then more slowly until day seven after yeast inoculation. At about day 7, the capacity of the soda lime to absorb carbon dioxide gas 814 was exhausted. At that time, pump 808 was deactivated, and the circulation of fluid out of and back into headspace 806 (through flow passage 822 and carbon dioxide absorber 816) was terminated.

After fluid circulation was terminated, experimental container 804 was fitted with a conventional airlock that allowed the remaining carbon dioxide gas 814 to freely escape to the external atmosphere. The airlock was attached to exit port 836 and reentry port 838 was fluidly sealed.

On day 12, the airlock and seal were removed and circulation of the headspace fluid mixture 810 through carbon dioxide absorber 816 was reestablished for two hours to obtain carbon dioxide gas 814 production readings as described above using flow meter 826 and gas samples from three-way stopcock 832 and three-way stopcock 834 to calculate a carbon dioxide production rate (per litre of juice) at that time.

The fermented experimental and control juices (in the form of wine at that this point) were racked off the lees on day 35 when the wines' specific gravity were 0.996 and the wines were relatively clear. The wines were cold stabilized and then fined using bentonite clay, specifically, Bentonite Vitiben™ (sold by Bosagrape Winery Supplies™, Burnaby, BC, Canada). After 84 days from yeast inoculation, the wines were finely filtered using a Buon Vino Super Jet™ pump with #2 filter pads (sold by Buon Manufacturing™ Inc., Cambridge, ON, Canada) and bottled on day 85.

During the 6 days of headspace recirculation and carbon dioxide gas absorption for experimental wine 802, approximately 70% of carbon dioxide gas 814 produced during the entire fermentation was removed by the soda lime.

To assess whether any organoleptic differences existed between the control and experimental wines, a taste test was conducted by an expert. The expert was given one 750 millilitre bottle of each of the control and experimental wine to taste periodically over a two day period. The two bottles were labeled A and B and the expert was blinded as to which was control and which was experimental. The expert was not aware of the nature of the experiment. The assessment was documented using a numerical scoring system of sixteen attributes, each having a range of values between 1 and 10 (based on Winespider.com™ rankings). Higher numbers for each attribute represented more desirable properties. The experts' taste test ratings are expressed as numerical data and qualitative descriptors in Table 1 below.

TABLE 1

Attribute Ratings for Control and Experimental Wines

| Attribute | Rating | |
|---|---|---|
| | Control Wine | Experimental Wine |
| Color | (7) Mid straw | (7) Mid straw |
| Viscosity | (5) 9% Alcohol (estimated by viewing) | (6) 10% alcohol (estimated by viewing) |
| Brilliance | (7) Vivid | (8) Crystal clear |
| Depth | (9) Very light | (9) Very light |
| Aromas | (5) Very subdued | (7) Obvious primary and secondary aroma |
| Faults | (10) No faults | (10) No faults |
| Varietal | (5) Very subdued varietal character | (8) Strong varietal character |
| Intensity | (3) Frail | (6) Strong |
| Complexity | (4) Commercial wine | (7) Complex |
| Concentration | (5) Average for commercial wine | (8) Concentrated |
| Fruit | (6) Subdued | (7) Restrained |
| Length of Residual Taste | (5) 3-5 seconds | (6) 5-8 seconds |

TABLE 1-continued

Attribute Ratings for Control and Experimental Wines

| | Rating | |
|---|---|---|
| Attribute | Control Wine | Experimental Wine |
| Aftertaste | (5) Commercial wine (3-4 seconds) | (6) Good commercial wine (5-6 seconds) |
| Balance | (5) Acidity out of balance | (7) Balanced |
| Phenolics | (8) Present but suited style | (9) Faint trace but acceptable |
| Acid | (8) Sufficient acid levels | (8) Sufficient acid levels |

Figure 12:
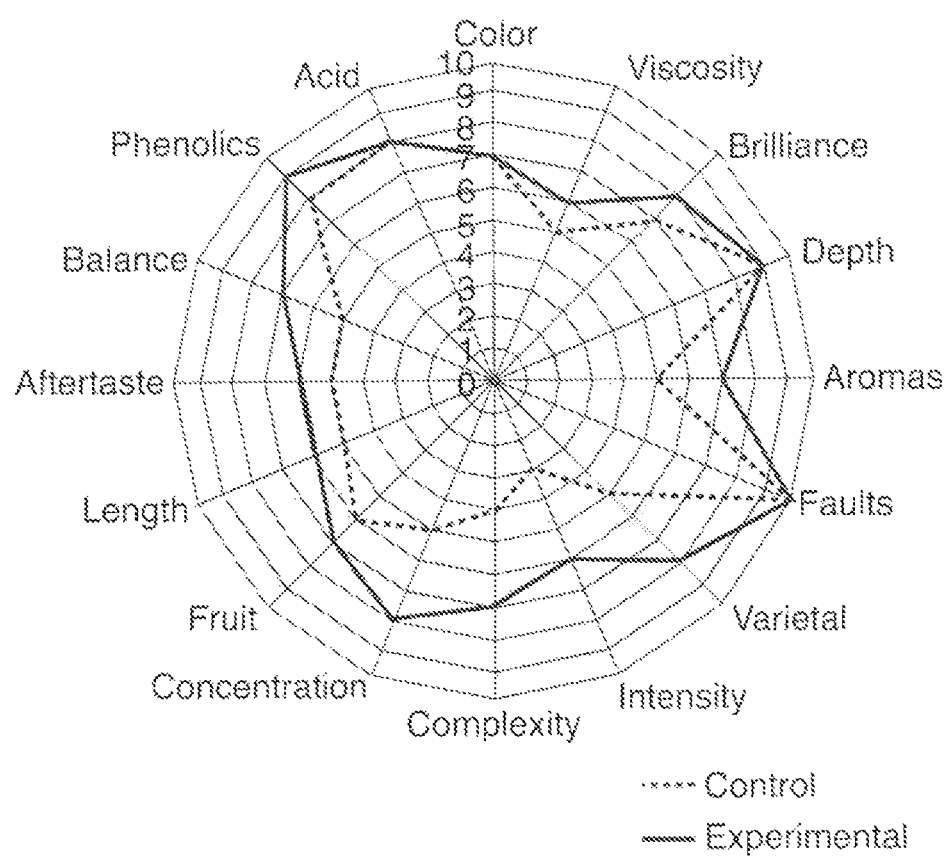
FIG. 12 is a graphical representation of the attributes of the experimental wine associated with the second experimental embodiment of FIG. 10.

The respective scores of the sixteen attributes are expressed on a radar, or spider web, chart in FIG. 12.

The above-described fermentation process was designed to produce a light-bodied white wine and many of the scores provided in Table 1 and FIG. 12 reflect that style. Table 1 and FIG. 12 show differences between the control and experimental wines, even though the control wine's complexity and aftertaste were rated as commercial quality. Most notably, the experimental wine had more desirable aromatic scent, a more intense flavor, more varietal character (aroma originating from the grape variety, Pinot Gris, in this case), its palate was more intense and complex, and it had longer residual taste. The experimental wine was deemed generally superior to the control wine.

Experiment #3

A fixed-site carrier membrane that functions at a relatively low pressure differential was used for Experiment #3. Fixed-site carrier membranes are described, for example, in United States Patent Publication No. 20080078290, which is hereby incorporated by reference in its entirety. This membrane is highly selective to carbon dioxide gas relative to larger desirable aromatic fluid compounds. This membrane is able to function at room temperature and in the presence of water vapour. The membrane transports carbon dioxide gas by simple diffusion from the feed side to the permeate side of the membrane. In addition, the membrane surface on the feed side of the membrane is coated with polyvinylamine. When the carbon dioxide gas contacts the feed side of the membrane, the polyvinylamine reacts with the carbon dioxide gas to produce bicarbonate on the feed side of the membrane. The bicarbonate then migrates to the permeate side of the membrane. On the permeate side, the bicarbonate then dissociates into carbon dioxide gas, thereby efficiently transferring the carbon dioxide gas from the feed side to the permeate side of the membrane.

The above-mentioned fixed-site carrier membrane was used in the fermentation apparatus of FIG. 10, to replace carbon dioxide absorber 816 and soda lime absorbing material 818 illustrated in FIG. 10. In this configuration, 27 litres of Gamay grape juice was placed in container 804. This juice was fermented and the fixed-site carrier membrane was used for the first 10 hours of active fermentation, until the carbon dioxide production rate exceeded the scrubbing rate of the fixed-site carrier membrane under accelerated carbon dioxide production rates. The membrane successfully removed 716 millilitres/hour of carbon dioxide gas from headspace fluid mixture 810. Although this was less than 1% of the peak carbon dioxide gas production rate, it was notable that the membrane successfully removed carbon dioxide gas from the flow passage. The surface area of the feed side of the flat, fixed-site carrier membrane was only 18 cm×18 cm. It is generally understood that the degree to which a membrane is able to remove carbon dioxide depends on its surface area at the interface of its feed side with feed gas (i.e. headspace fluid mixture 810, FIG. 10). It is generally understood that a larger surface area will increase the extent of material separation. It was expected that with a greater surface area, the fixed-site carrier membrane would have removed a much larger amount of carbon dioxide gas from the system while retaining aromatic fluid in the flow passage, thereby having a significant effect on the aromatic properties of the fermented juice.

Experiment #4

A fourth experimental embodiment is discussed below with reference to FIG. 13 and exemplary fermentation apparatus 900.

Pinot Gris and Gamay grapes were picked, crushed and pressed to yield 49 litres and 57 litres of unsettled juice, respectively. Both pressed juices were allowed to settle for 38 hours under a controlled, cool climate in which the surrounding temperature was held at approximately 10° Celsius. The settled juices were then racked to clean containers.

The 44 litres of settled Pinot Gris juice had the following initial properties: Brix of 21.8°, specific gravity of 1.100, titratable acidity of 6.5 grams/litre and pH of 3.30. Potassium metabisulfite, in a quantity of 1.94 grams, was added to the Pinot Gris juice to obtain a molecular sulfur dioxide content of 0.80 parts per million.

The 44 litres of settled Pinot Gris juice also had the following ingredients added: 13.2 g of OptiWHITE™ (sold by Lallemand™ Inc., Montreal, Quebec, Canada), 1.3 ml of Antifoam FG9030™ (sold by Vinquiry™, Windsor, Calif., U.S.A.), 5.5 g of Fermaid-K™ (sold by Lallemand™ Inc., Montreal, Quebec, Canada), and 11.0 g BA11™ yeast previously hydrated in 260 ml water containing 13.2 g Go-Ferm (sold by Lallemand™ Inc., Montreal, Quebec, Canada). The treated Pinot Gris juice was then thoroughly stirred and transferred into two clean fermentation containers, with 21 litres of juice and approximately 6 litres of headspace in each container. One container was filed with the 21 litres of juice 902 (FIG. 13) and labelled "experimental". The other fermentation container was also filled with 21 litres of juice with approximately 6 litres of headspace and labelled "control". The fermentation containers for both the control and experimental juice were initially fitted with a common airlock to allow carbon dioxide gas to freely escape to the atmosphere from the container's headspace. The headspace of both the control and experimental containers was flushed with carbon dioxide gas prior to fermentation, to remove oxygen.

The skins and juice of the crushed Gamay grapes were allowed to remain in contact for 18 hours to impart a light red color (rosé) to the Gamay juice prior to pressing. The 53 litres of pressed and settled Gamay Rosé juice had the following initial properties: Brix of 21.1°, specific gravity of 1.094, titratable acidity of 7.8 grams per litre and a pH of 3.30. Potassium metabisulfite, in the quantity of 2.33 grams, was added to the Gamay juice to obtain a molecular sulfur dioxide content of 0.80 parts per million.

The 53 litres of settled Gamay Rosé juice also had the following ingredients added: 15.9 g of OptiWHITE™ (sold by Lallemand™ Inc., Montreal, Quebec, Canada), 1.6 ml of Antifoam FG9030™ (sold by Vinquiry™, Windsor, Calif., U.S.A.), 6.7 g of Fermaid-K™ (sold by Lallemand™ Inc., Montreal, Quebec, Canada), and 13.3 g BA11™ yeast previously hydrated in 320 ml water containing 15.9 g Go-Ferm (sold by Lallemand™ Inc., Montreal, Quebec, Canada). The treated Gamay Rosé juice was then thoroughly stirred and transferred into two clean fermentation containers, with 23 litres of juice and approximately 5 litres of headspace in each container. One container was labelled "experimental", and the other fermentation container was labelled "control". Both fermentation containers were initially fitted with a common airlock to allow carbon dioxide gas to freely escape to the atmosphere. The headspace of both the control and experimental containers was flushed with carbon dioxide gas prior to fermentation, to remove oxygen.

Figure 13:
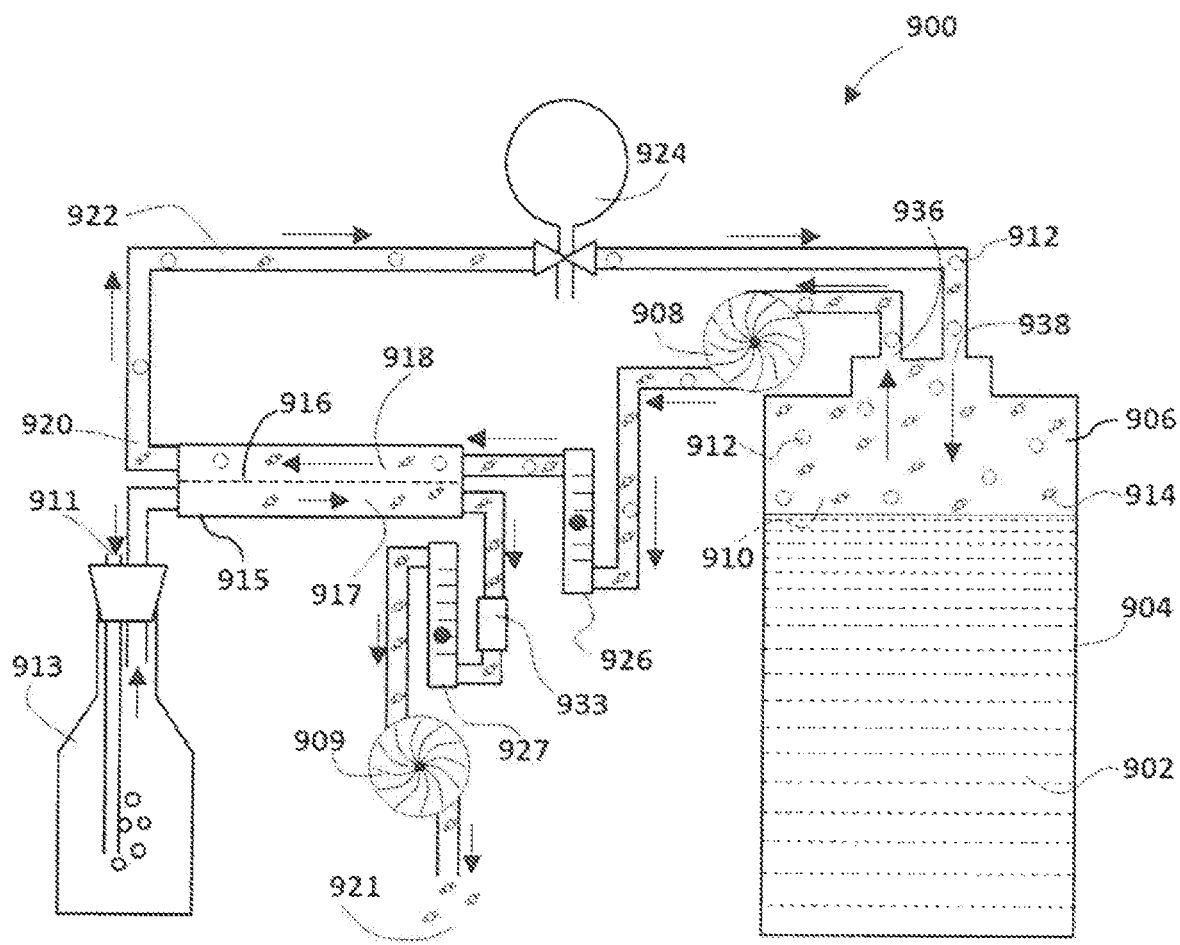
FIG. 13 is a side elevation view of a fermentation apparatus in accordance with a fourth experimental embodiment.

FIG. 13 illustrates the experimental fermentation apparatus 900 used to ferment Pinot Gris juice and Gamay Rosé juice (juice is indicated at 902) transferred to the fermentation containers 904 labelled experimental. Headspace 906 contained aromatic fluid 912 and carbon dioxide gas 914 during fermentation.

At the first sign of active fermentation of juice 902, the airlock initially fitted to the experimental container was removed and replaced with the carbon dioxide separation membrane system 915 and flow passage 922, which were connected to ports 936 and 938 respectively. Headspace 906, flow passage 922, carbon dioxide separation membrane system 915 and expansion chamber 924 were flushed with carbon dioxide gas to remove oxygen.

Airtight pump 908 circulated headspace fluid mixture 910 (including aromatic fluid 912 and carbon dioxide 914) from headspace 906 through outlet 936 to the sealed carbon dioxide separation membrane system 915. Carbon dioxide separation membrane system 915 consisted of membrane 916 with feed side 918 and permeate side 917. Membrane 916 was a fixed site carrier membrane supplied by the Department of Chemical Engineering, Norwegian University of Science and Technology, Trondheim, Norway. Membrane holder 915 consisted of two units connected in series, each containing two flat sheet membranes with a total of 0.27 m$^2$ membrane area. Pump 908 also circulated a modified fluid in retentate stream 920 of carbon dioxide separation membrane system 915 through flow passage 922 and back into headspace 906 via inlet port 938.

Fermentation apparatus 900 included expansion chamber 924 initially containing carbon dioxide gas to accommodate pressure fluctuations in flow passage 922. Fermentation apparatus 900 also included flow meter 926 to monitor the flow of headspace fluid mixture 910 from headspace 906 to feed side 918 of carbon dioxide separation membrane 916. Pump 909 sucked room air sweep gas 911 through humidifier 913, then through permeate side 917 of carbon dioxide separation membrane system 915 and then through flow meter 927. Room air 911 carried away carbon dioxide that diffused through membrane 916 and vented it to atmosphere 921.

Knowing total permeate flow from flowmeter 927 and carbon dioxide concentration at permeate sample port 933, the carbon dioxide flow across membrane 916 could be calculated according to equation:

Carbon dioxide flow across membrane 916=(Total permeate flow 927)*(fractional concentration of carbon dioxide from sample port 933)

The carbon dioxide measured at sample port 933, measured as the fraction of carbon dioxide in the permeate stream (FpCO2), causes the flowing gas to be more dense which affects the accuracy of flow meters calibrated for room air. The indicated flow in flow meter 927 was corrected for the effects of carbon dioxide using the following equation:

Corrected flow at flowmeter 927=(SQRT(1/(((1-FpCO2)*0.766)+((1-FpCO2)*0.233+(FpCO2*1.53))))*(Indicated flow at flowmeter 927).

Carbon dioxide was measured at port 933 using a Viasensor™ carbon dioxide analyzer (model G110, AFC International™ Inc., DeMotte, Ind., USA) and calculated carbon dioxide flow was used to follow the kinetics of fermentation.

Membrane scrubbing of carbon dioxide from flow passage 922 was conducted in the same way for both Pinot Gris and Gamay Rosé. Membrane carbon dioxide scrubbing commenced when carbon dioxide first appeared in the headspace 906 (detected by bubbling in the airlock). For Pinot Gris, the membrane 916 was used for only the first 22 hours of active fermentation until just after the peak carbon dioxide production occurred. For Gamay Rosé membrane carbon dioxide scrubbing took place from the first indications of carbon dioxide production until at least 90% of the fermentation had taken place. At the termination of membrane carbon dioxide scrubbing, a simple airlock was installed and any carbon dioxide and aroma in headspace 906 was allowed to escape to atmosphere.

Pinot Gris Fermentation:

Carbon dioxide was first detected by bubbling in the airlock 32 hours after yeast inoculation. Headspace recirculation past membrane 916 was initiated at that time. Membrane carbon dioxide separation and headspace recirculation continued until the peak carbon dioxide production was detected using the equation above for carbon dioxide flow across membrane 916. This occurred at 54 hours post yeast inoculation (22 hours of headspace recirculation). At this point an airlock was installed on the experimental container which allowed headspace 906 to escape to atmosphere for the remainder of fermentation. The entire fermentation required 32 days to complete.

Gamay Rosé Fermentation:

Active fermentation, indicated by carbon dioxide bubbling in the airlock, was first observed 25 hours after yeast inoculation. Headspace recirculation and membrane carbon dioxide separation was started at that time and continued until 204 hours (8.5 days) post-yeast inoculation. At this time the bulk of fermentation was complete and the airlock was put back on the container to allow any remaining carbon dioxide production to escape to the atmosphere. The entire fermentation required 25 days.

For both the Pinot Gris and the Gamay Rosé, the fermented experimental and control wines were allowed to settle for about two weeks before racking the wine off the lees. The wines were cold stabilized at 0° Celsius for 2 weeks and then fined using bentonite clay, specifically, Bentonite Vitiben™ (sold by Bosagrape Winery Supplies™, Burnaby, BC, Canada). After 97 and 88 days, respectively, the Pinot Gris and Gamay Rosé wines were filtered using a Buon Vino Super Jet™ pump with #2 filter pads (sold by Buon Manufacturing™ Inc., Cambridge, ON, Canada) and bottled.

Ninety days after bottling the wines were tasted and scored. The tasting panel consistent of seven winemakers with an average of more than 15 years commercial winemaking experience. There were also two chefs with extensive knowledge of wine quality and one winery owner with extensive wine tasting experience. The Pinot Gris and Gamay Rosé were blinded as to whether they were control or experimental but the tasting panel did know the varietal of grape from which the wine was made. According to a code prepared by random number generation, the control was labeled either "A" or "B". Samples were poured into wine glasses and the samples were placed on colored placemats labeled "A" in red and "B" in blue.

Figure 14:
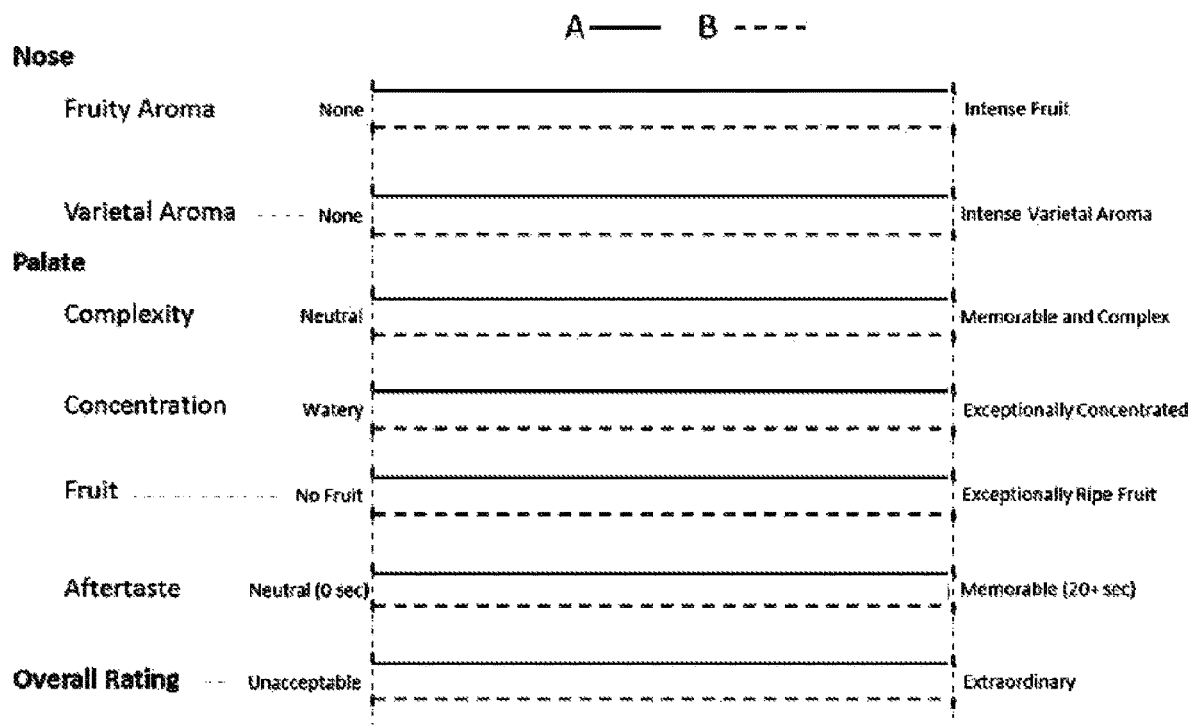
FIG. 14 is an example of a scorecard used to score attributes of the experimental wine associated with the fourth experimental embodiment of FIG. 13.

The tasters were instructed to sample wine A and then compare it to wine B by marking their score on a horizontal 10 cm long visual analog scale (VAS) (shown in FIG. 14). Marks toward the left-hand end of the line were less positive than marks toward the right-hand end. There were seven attributes rated in this way for each sample. Following the tasting, the code was broken and the scores for each of the four wines were obtained by measuring the distance in centimeters from the left-hand end of the VAS.

Figure 15:
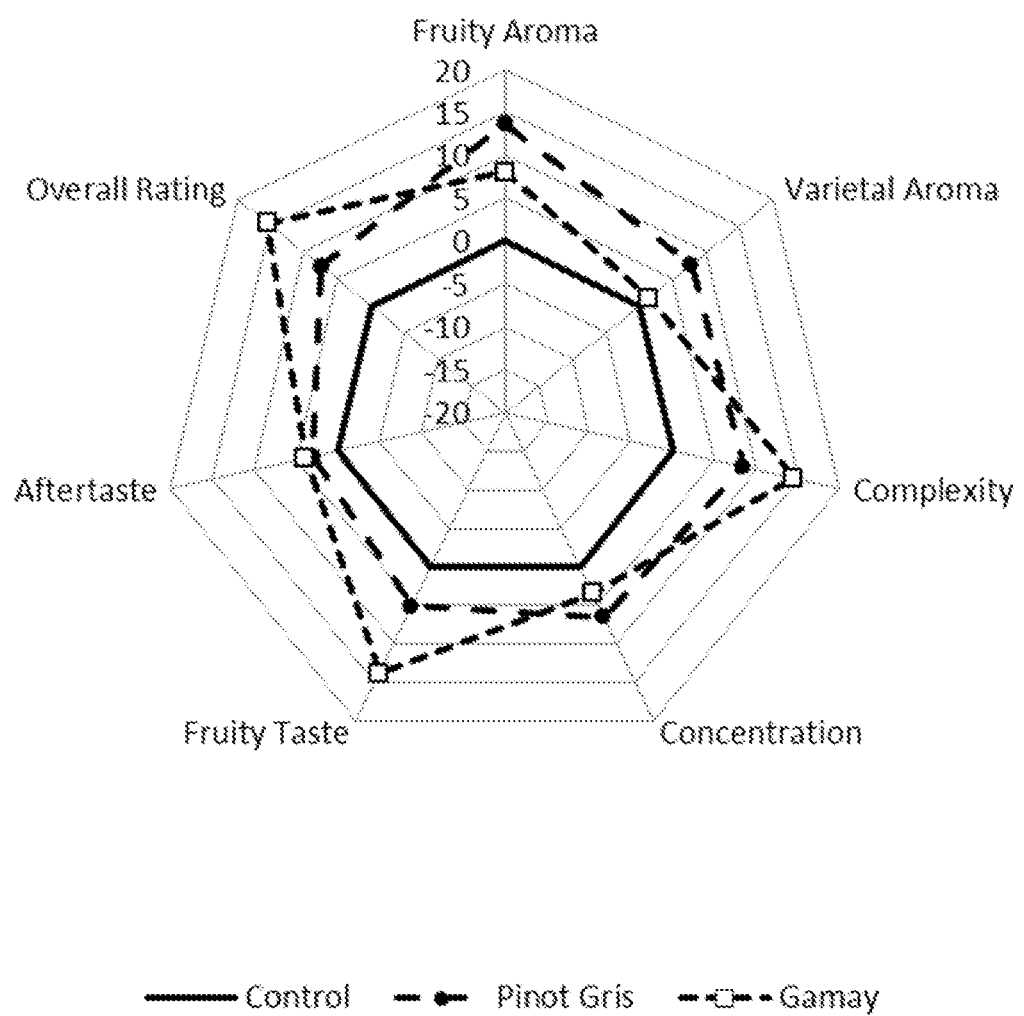
FIG. 15 is a graphical representation of the attributes of the experimental wine associated with the fourth experimental embodiment of FIG. 13.

The objective was to determine if control and experimental wines were different so the difference between the two ratings for each attribute was determined. This difference was translated into % change and plotted on a radar graph (FIG. 15) based on the mean scores from the 10 tasters. The control wine was given a zero score for each attribute. Negative values indicate the experimental wine was judged inferior for that attribute and positive values for the experimental wine indicate a more favorable score for that attribute. The tasters rated all seven attributes with higher scores for the membrane-treated experimental wines. The largest positive changes were observed for "fruity aroma, complexity, fruity taste and overall rating". These are the types of changes expected if the membrane-treated wine contained higher levels of aroma compounds.

The aroma compounds were also analyzed at the Mass Spectrometry Facility Lab in the Wine Research Centre at the University of British Columbia in Vancouver, BC. Samples of 300 ml wine were transported by automobile from Naramata, BC to Vancouver (450 km). Prior to sample analysis, an aliquot of each sample (5 ml) of wine was pipetted into a 20 ml headspace vial (Agilent, US) that contained 1.5 g Sodium Chloride, crimped with a 3 mm tan PTFE/white silicon rubber septa (Canada Life Science, Canada).

Metabolites profiling was done by headspace solid phase micro extraction (HS-SPME) method using carboxen-polydimethylsiloxane-divinylbenzene, CAR/PDMS/DVB fiber (Supelco, USA) on an Agilent 7890/5975C gas chromatograph quadrupole mass spectrometer in electron ionization mode fitted with an Agilent J&W DB-WAX 30 m×0.25 mm ID, 0.25 um thickness fused silica column (Agilent, USA). All samples for GCMS analyses were injected in duplicate, one injection per vial and data were analyzed using Enhanced Chemstation software (Agilent, USA). The spectra were matched against Wiley9Nist08 mass spectrum libraries (Wiley, US).

Each sample was incubated and agitated for 5 minutes at 30° C., 500 rpm prior to SPME fiber adsorption for another 5 minutes followed by fiber injection and desorption in the GC injection port for additional 3 minutes. The GC oven program temperature started at 40° C. hold for 4 min then increased to 150° C. at 3° C./min and further increased to a final temperature of 230° C. at 25°/min and hold for 10 minutes. The injector temperature was 250° C. and the injection was done with a split ratio of 3:1. Helium was used as the carrier gas with a flow of 1 ml/min. The mass spectrometer was operated in scan mode (33-450)

Figure 16:
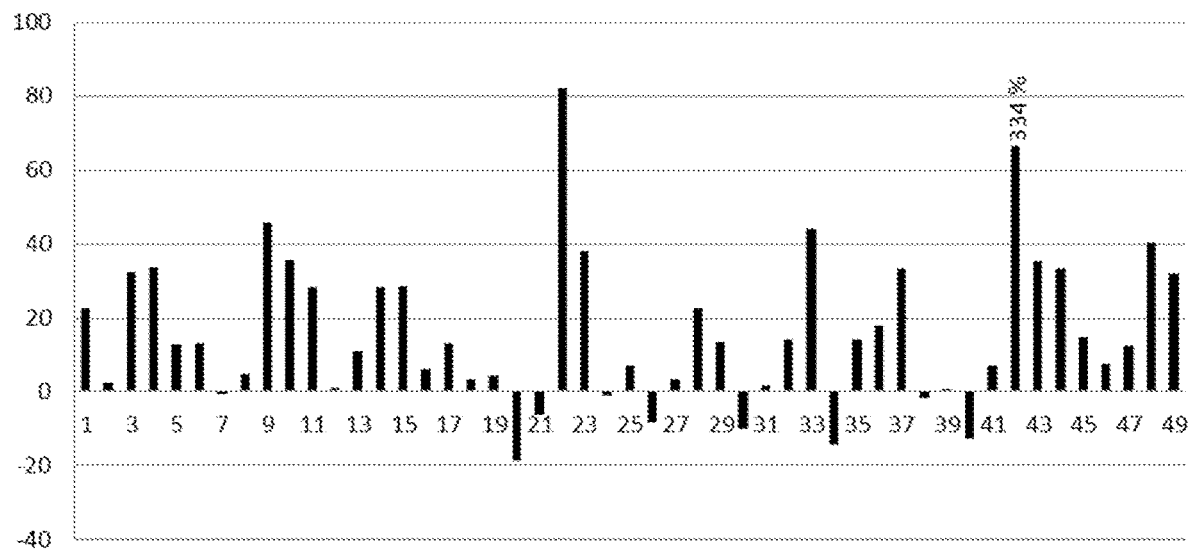
FIG. 16 is a graphical representation of the percent change in aroma compounds of an experimental wine associated with the fourth experimental embodiment of FIG. 13 compared to a control wine.

FIG. 16 shows the results for all measured peak areas in the Pinot Gris wine. The plot in FIG. 16 shows the percent change for each measured peak in the experimental Pinot Gris wine as compared with the peaks for the control Pinot Gris wine. Table 2 shows the aroma compounds measured for the plot shown in FIG. 16.

TABLE 2

Pinot Gris—All Measured Aroma Compounds

| | |
|---|---|
| 1 | ethyl acetate |
| 2 | ethanol |
| 3 | Ethyl propanoate |
| 4 | Ethly isobutanoate |
| 5 | Isobutyl acetate |
| 6 | 1,1,3,3-Tetramethyl-1,3-diethoxydisiloxane |
| 7 | Ethyl butanoate |
| 8 | 1-Propanol |
| 9 | Ethyl 2-methylbutanoate |
| 10 | Ethyl isovalerate |
| 11 | Ethyldibutoxysilane |
| 12 | Isobutanol |
| 13 | Isoamyl acetate (banana oil) |
| 14 | 1-Butanol |
| 15 | iso-Amyl iso-butyrate |
| 16 | 2-Methyl-1-butanol |
| 17 | 3-Methyl-1-butanol |
| 18 | Ethyl hexanoate |
| 19 | Amyl butyrate |
| 20 | Hexyl acetate |
| 21 | 4-Hexenyl-1-pentanol |
| 22 | 3-Methyl-1-pentanol |
| 23 | Ethyl 2-hexenoate |
| 24 | 1-Hexanol |
| 25 | 3-Hexen-1-ol |
| 26 | Ethyl octanoate |
| 27 | Isoamyl hexanoate |
| 28 | Methoxy(n-pentyloxy)methylsilane |
| 29 | Benzene, 1-(dimethoxymethyl)-4-(1-methoxy-1-methylethyl)- |
| 30 | 2,3-Butanediol |
| 31 | Ethyl nonanoate (wine ether) |
| 32 | Isobutyric acid |
| 33 | Butyrolactone |
| 34 | Ethyl decanoate |
| 35 | Isoamyl caprylate |
| 36 | Diethyl succinate |
| 37 | ethyl 9-decenoate/10 |
| 38 | Oxime-, methoxy-ohenyl-_ |
| 39 | Phenylethyl acetate |
| 40 | Ethyl laurate |
| 41 | Isopentyl decanoate |
| 42 | 1,3-Di(isobutoxycarbonyl)-2,4,4-trimethylpentane |
| 43 | Phenylethyl alcohol |
| 44 | Octanoic acid |
| 45 | Isophthalaldehyde |
| 46 | Dimethylacetophenone |
| 47 | Benzoic acid |
| 48 | 1-Butyl 2-isobutyl phthalate |
| 49 | Butyl phthalate |

Peak areas for 18 of 49 measured compounds changed less than 10% from control peak areas. There were 3 compounds (2 ethyl esters and 1 acetate ester) that decreased in the experimental wine compared to the control wine. However, 28 of 49 aroma compounds increased by more than 10% in the experimental membrane-treated Pinot Gris wine compared to the control wine. The average change in peak area for all measured aroma compounds was +22.3%.

Figure 17:
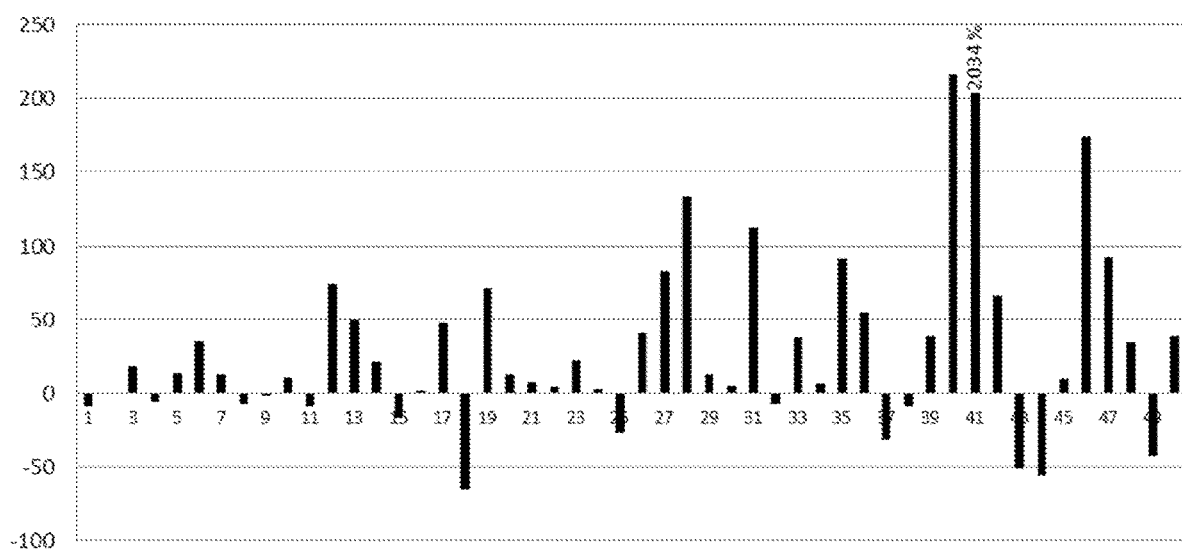
FIG. 17 is a graphical representation of the percent change in aroma compounds of another experimental wine associated with the fourth experimental embodiment of FIG. 13 compared to a control wine.

FIG. 17 shows the results for all measured peak areas in Gamay Rosé wine. The plot in FIG. 17 shows the percent change for each measured peak in the experimental Gamay Rosé wine as compared with the peaks for the control Gamay Rosé wine. Table 3 shows the aroma compounds measured for the plot shown in FIG. 17.

TABLE 3

Gamay Rosé—All Measured Aroma Compounds

| | |
|---|---|
| 1 | Hexamethylcyclotrisiloxane |
| 2 | Dimethyldiethoxysilane |
| 3 | Ethyl Acetate |
| 4 | Ethanol |

TABLE 3-continued

Gamay Rosé—All Measured Aroma Compounds

| | |
|---|---|
| 5 | Ethyl propanoate |
| 6 | Ethyl isobutanoate |
| 7 | Octamethyltetrasiloxane |
| 8 | Isobutyl acetate |
| 9 | 1,1,3,3-Tetramethyl-1,3-diethoxydisiloxane |
| 10 | Ethyl butanoate |
| 11 | Propanol |
| 12 | Ethyl 2-methylbutanoate |
| 13 | Ethyl isopentanoate |
| 14 | Ethyldibutoxysilane |
| 15 | Isobutanol |
| 16 | Isoamyl acetate (banana oil) |
| 17 | 1-Butanol |
| 18 | Ethyl crotonate |
| 19 | Pentyl isobutyrate |
| 20 | 2-Methylbutanol |
| 21 | 3-Methylbutanol |
| 22 | Ethyl hexanoate |
| 23 | Styrene |
| 24 | Butyl isovalerate |
| 25 | Hexyl acetate |
| 26 | 4-Methyl-1-pentanol |
| 27 | 3-Methyl-1-pentanol |
| 28 | Ethyl heptanoate (wine oil) |
| 29 | Ethyl 2-hexanoate |
| 30 | Hexanol |
| 31 | 2-nonanone |
| 32 | Ethyl octanoate |
| 33 | Acetic acid |
| 34 | Isoamyl hexanoate |
| 35 | 2,3-Butanediol |
| 36 | Butyrolactone |
| 37 | Ethyl decanoate |
| 38 | Dimethylsilanediol |
| 39 | Isoamyl octanoate |
| 40 | Diethyl succinate |
| 41 | Ethyl 9-decenoate/10 |
| 42 | Phenylethyl acetate |
| 43 | Ethyl laurate |
| 44 | 2-methylbutyl decanoate |
| 45 | 1,3-Di(isobutoxycarbonyl)-2,4,4-trimethylpentane |
| 46 | Phenylethyl alcohol |
| 47 | Octanoic Acid |
| 48 | Cumic aldehyde |
| 49 | 2,5-Di-tert-butylphenol |
| 50 | Benzoic acid |

The pattern for the Gamay Rosé peaks was similar to that obtained for the Pinot Gris wine. 15 of 50 measured aroma compounds changed by less than 10%, while 7 compounds (4 ethyl esters, 1 alcohol, 1 acetate ester and 1 alkylated phenol) decreased more than 10%. However, peak area for 28 of 50 measured aroma compounds increased more than 10% in the experimental Gamay Rosé wine compared to the control wine. The average change in peak area was +66.9%, although much of this increase was due to the large increases in diethyl succinate, ethyl 9-decenoate and phenylethyl alcohol after membrane treatment.

In summary, the results of Experiment #4 indicate that fermenting wine while scrubbing carbon dioxide from the recirculated headspace with a fixed-site carrier membrane and allowing the carbon dioxide to pass out to the atmosphere retains wine aroma compound concentrations at higher levels than using conventional fermentation with an airlock or open top container. The recirculation of aroma compounds in flow passage 922 and headspace 906 retards flow of volatile compounds from the wine and produces wine with increased aroma and better taste.

The Pinot Gris results are notable because membrane carbon dioxide scrubbing was applied only during the first day of fermentation. The increased aroma compound concentration in the finished Pinot Gris suggests it can be important to retain these compounds during the early phase of fermentation, while the later phase of fermentation may in some instances be less important in preventing aroma compound loss. This is reinforced by the Gamay Rosé results. Membrane treatment for the entire fermentation of the Gamay Rosé increased aroma concentrations but also caused greater loss of volatile aroma compounds than was observed for the Pinot Gris. Without being limited by theory, this may be because of diffusion across the membrane 916. Therefore, long duration use of the membrane during fermentation may in some instances not be desirable for maximizing aroma in the finished wine. This makes the commercial utility of membrane carbon dioxide scrubbing more appealing.

While the present embodiments as herein shown and described in detail are representative of the subject matter which is broadly contemplated by the present invention, the scope of the claims should not be limited by the preferred embodiments set forth in the examples, but should be given the broadest interpretation consistent with the description as a whole. Moreover, it is not necessary for an apparatus or method to address each and every problem sought to be solved by the present invention, for it is to be encompassed by the present claims.

The invention claimed is:

1. A method for preserving the aroma of a fermentable beverage, the method comprising:
    fermenting the beverage in a fermentation container to produce a headspace fluid mixture comprising at least carbon dioxide gas and an aromatic fluid in a headspace located above the beverage contained in the fermentation container, wherein said fermenting comprises a loss of aromatic fluid from the fermenting beverage to the headspace fluid mixture at a first rate; and
    increasing an aromatic fluid concentration within the headspace fluid mixture by removing at least a portion of the carbon dioxide from the headspace fluid mixture, wherein the headspace fluid mixture is gaseous or vapor and interacts with the beverage, and wherein the increased aromatic fluid concentration within the headspace fluid mixture acts to at least slow the loss of aromatic fluid from the fermenting beverage to a second rate that is less than the first rate.

2. The method of claim 1, wherein said removing comprises pumping the headspace fluid mixture through a flow passage.

3. The method of claim 1, wherein said removing at least the portion of the carbon dioxide comprises at least the portion of the carbon dioxide exiting through a release valve.

4. The method of any one of claim 1, further comprising the headspace fluid mixture interacting with a membrane.

5. A method for preserving the aroma of a fermentable beverage, the method comprising:
    fermenting the beverage in a fermentation container to produce a headspace fluid mixture comprising at least carbon dioxide gas and an aromatic fluid in a headspace located above the beverage contained in the fermentation container; and
    the headspace fluid mixture exiting out of the container into a flow passage;
    producing a modified fluid having a higher aromatic fluid concentration than the headspace fluid mixture by removing at least a portion of the carbon dioxide of the headspace fluid mixture that is in the flow passage, wherein the modified fluid is a gas or vapor; and
    returning the modified fluid from the flow passage to the container, the modified fluid mixing with the headspace fluid mixture to increase the aromatic fluid concentration within the headspace fluid mixture, wherein the headspace fluid mixture interacts with the beverage, and wherein the increased aromatic fluid concentration within the headspace fluid mixture acts to at least slow the loss of aromatic fluid from the fermenting beverage.

6. The method of claim 5, further comprising pumping the headspace fluid mixture through the flow passage.

7. The method of any one of claim 5, wherein said removing at least the portion of the carbon dioxide comprises at least the portion of the carbon dioxide exiting through a release valve.

8. The method of any one of claim 5, wherein said headspace fluid mixture exiting out of the container into the flow passage occurs during an entire duration of said fermenting.

9. The method of any one of claim 5, wherein said headspace fluid mixture exiting out of the container into the flow passage occurs during less than an entire duration of said fermenting.

10. The method of any one of claim 5, further comprising the headspace fluid mixture in the flow passage interacting with a membrane.

11. A method for preserving the aroma of a fermentable beverage, the method comprising:

fermenting the beverage in a fermentation container to produce a headspace fluid mixture comprising at least carbon dioxide gas and an aromatic fluid in a headspace located above the beverage contained in the fermentation container;

permitting the headspace fluid mixture to exit the container into a flow passage;

permitting the headspace fluid mixture to flow through the flow passage and into contact with a membrane thereby producing a modified fluid in the flow passage, wherein the modified fluid is a gas or vapor, and has a higher aromatic fluid concentration than the headspace fluid mixture; and permitting the modified fluid in the flow passage after contacting the membrane to reenter the headspace to at least partially retain the aromatic fluid in the fermentable beverage in the fermentation container.

12. The method of claim 11, further comprising pumping the headspace fluid mixture through the flow passage.

13. The method of any one of claim 11, further comprising removing a portion of the headspace fluid mixture within the flow passage through a release valve.

14. The method of any one of claim 11, wherein said permitting the headspace fluid mixture to exit the container into the flow passage occurs during an entire duration of said fermenting.

15. The method of any one of claim 11, wherein said permitting the headspace fluid mixture to exit the container into the flow passage occurs during less than an entire duration of said fermenting.

* * * * *